(12) United States Patent
Asai

(10) Patent No.: US 10,298,805 B2
(45) Date of Patent: May 21, 2019

(54) NON-TRANSITORY COMPUTER-READABLE MEDIUM AND PORTABLE DEVICE

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/889,901

(22) Filed: Feb. 6, 2018

(65) Prior Publication Data
US 2018/0234581 A1 Aug. 16, 2018

(30) Foreign Application Priority Data
Feb. 13, 2017 (JP) ................. 2017-023855

(51) Int. Cl.
*H04N 1/04* (2006.01)
*H04N 1/32* (2006.01)
*H04N 1/00* (2006.01)

(52) U.S. Cl.
CPC ..... *H04N 1/32534* (2013.01); *H04N 1/00307* (2013.01); *H04N 1/00424* (2013.01); *H04N 1/00915* (2013.01); *H04N 1/32122* (2013.01); *H04N 1/32368* (2013.01); *H04N 1/32539* (2013.01); *H04N 2201/0075* (2013.01); *H04N 2201/0094* (2013.01); *H04N 2201/0096* (2013.01); *H04N 2201/3202* (2013.01); *H04N 2201/3266* (2013.01); *H04N 2201/3274* (2013.01)

(58) Field of Classification Search
CPC ........... H04N 1/32534; H04N 1/32122; H04N 1/00307; H04N 1/32368; H04N 1/00424
USPC ....................................... 358/1.15
See application file for complete search history.

(56) References Cited

U.S. PATENT DOCUMENTS 9,497,337 B2 * 11/2016 Kodimer ............ H04N 1/00307
2008/0201735 A1   8/2008 Sumiyoshi et al.
2012/0243043 A1   9/2012 Asai

FOREIGN PATENT DOCUMENTS

JP   2008-187575 A   8/2008
JP   2012-203742 A   10/2012

* cited by examiner

*Primary Examiner* — Houshang Safaipour
(74) *Attorney, Agent, or Firm* — Merchant & Gould P.C.

(57) ABSTRACT

A non-transitory computer-readable medium having a computer program stored thereon and readable by a computer of a portable device, the computer program, when executed by the computer, causes the portable device to perform operations including: receiving a user operation of designating operation specifying information; instructing an image processing apparatus to execute the image processing operation of a content specified by the operation specifying information; storing history information indicative of an execution history of the receiving and the instructing; extracting, from among a plurality of program identification information, program identification information associated with the extraction condition information coinciding with the stored history information; and displaying the extracted program identification information.

15 Claims, 15 Drawing Sheets

FIG. 3

| APPLICATION ID | FUNCTION INFORMATION | INSTALL INFORMATION | EXTRACTION CONDITION INFORMATION ||| 
| --- | --- | --- | --- | --- | --- |
| | | | DEGREE OF IMPORTANCE | EXTRACTION CONDITION | RECOMMENDATION REASON |
| GREETING CARD | SHEET PRINT SHEET SCAN | NOT INSTALLED | LOW | SHEET SIZE = POSTCARD | SIMPLY DESIGN GREETING CARD |
| COOPERATION | SHEET PRINT SHEET SCAN | INSTALLED | LOW | PRINT AND SCAN ARE EXECUTED WITH SEPARATE DEVICES | COOPERATE MULTIPLE DEVICES |
| MAIL PRINT | SHEET PRINT | INSTALLED | HIGH | LOGIN ERROR | CORRESPONDING TO DIVERSE DOMAINS |
| PDF CONVERSION | SHEET PRINT | NOT INSTALLED | HIGH | SIZE ERROR | CORRESPONDING TO FILE OF 50MB OR LARGER |
| | | | LOW | SERVER CONVERSION = 5 TIMES | PDF CONVERSION IS POSSIBLE AT LOCAL |
| LABEL | LABEL PRINT LABEL SCAN | NOT INSTALLED | MIDDLE | LABEL CORRESPONDING DEVICE | USING LABEL FUNCTION |
| PRINT DEDICATED | SHEET PRINT | UNINSTALLED | LOW | NUMBER OF PRINT TIMES = 5 TIMES | PRINT WITH SIMPLE OPERATION |

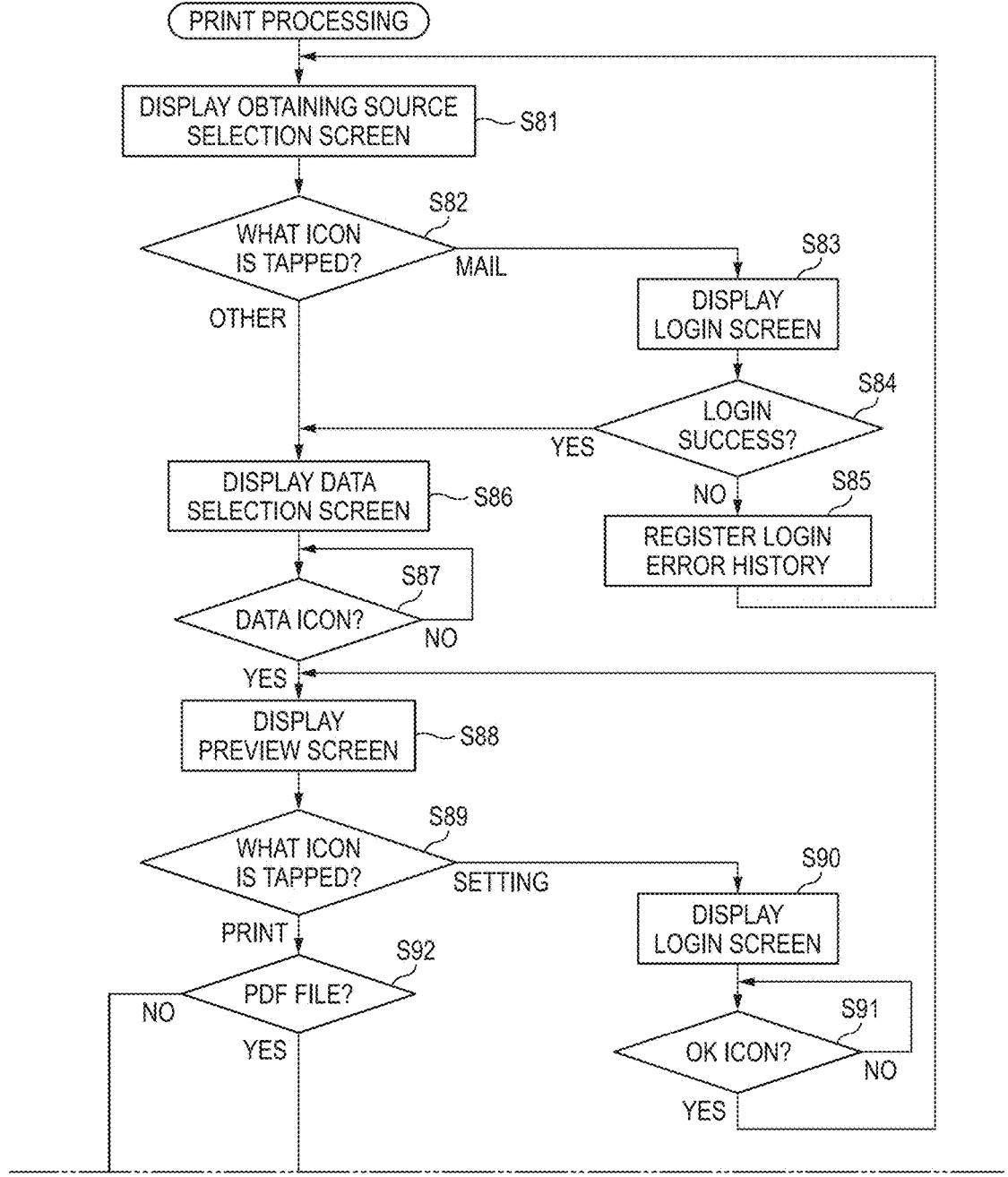

NON-TRANSITORY COMPUTER-READABLE MEDIUM AND PORTABLE DEVICE

CROSS-REFERENCE TO RELATED APPLICATION

This application claims priority from Japanese Patent Application No. 2017-023855 filed on Feb. 13, 2017, the entire subject-matter of which is incorporated herein by reference.

TECHNICAL FILED

The disclosure relates to a program of a portable device configured to enable an image processing apparatus to execute an image processing operation.

BACKGROUND

There has been disclosed a terminal program for enabling an image processing apparatus to execute an image processing operation. The related-art terminal program can activate an external program, which replaces functions of the terminal program, or an external program, which complements functions of the terminal program. More specifically, the external program includes a program that provides an interface for editing image data, which is a target of the image processing operation, a program that is specialized to some functions provided in the terminal program, and the like.

In recent years, the number of the external programs published on the Internet gradually increases. That is, even when an external program to provide a user with a convenient function, it is difficult to find out the external program,

SUMMARY

Illustrative aspects of the disclosure provide a technology of appropriately notifying an external program configured to replace or complement a function of a program, which is configured to enable an image processing apparatus to execute an image processing operation, in conformity to a using aspect of the program.

According to one illustrative aspect, there may be provided a non-transitory computer-readable medium having a computer program stored thereon and readable by a computer of a portable device, the portable device comprising a memory, an input interface, a communication interface, and a display, the computer program, when executed by the computer, causes the portable device to perform: receiving, through the input interface, a user operation of designating operation specifying information, the operation specifying information specifying a content of an image processing operation to be executed by an image processing apparatus; instructing the image processing apparatus, which is able to perform communication with the portable device through the communication interface, to execute the image processing operation of the content specified by the operation specifying information; and storing, in the memory, history information indicative of an execution history of the receiving and the instructing, wherein the memory stores therein a plurality of sets of program identification information and extraction condition information, the program identification information being for identifying an external program, the external program being installable in the portable device and being able to instruct the image processing apparatus to execute the image processing operation, the extraction condition information corresponding to the history information that is storable in the memory, and wherein the computer program, when executed by the computer, further causes the portable device to perform: extracting, from among the plurality of program identification information, program identification information that is associated with the extraction condition information coinciding with the history information stored in the memory; and displaying, on the display, the extracted program identification information.

According thereto, based on the execution history indicating that the image processing apparatus has been enabled to execute the image processing operation in accordance with the operation specifying information designated by the user, some of the plurality of external programs are notified to the user. That is, it is possible to enable the user to recognize an external program, which coincides with the user's implementation intention through the program, of the plurality of external programs published on the Internet.

BRIEF DESCRIPTION OF DRAWINGS

FIG. 3 depicts a program list stored in a memory 62;

FIGS. 9A and 9B depict display examples of a display 53, in which FIG. 9A depicts a main screen, and FIG. 9B depicts an obtaining source selection screen;

FIGS. 10A and 10B depict display examples of the display 53, in which FIG. 10A depicts a data selection screen, and FIG. 10B depicts a preview screen corresponding to designated data "price estimate.PDF";

FIGS. 11A and 11B depict display examples of the display 53, in which FIG. 11A depicts a preview screen corresponding to designated data "photograph.JPEG", and FIG. 11B depicts a setting screen;

FIGS. 12A and 12B depict display examples of the display 53, in which FIG. 12A depicts a login screen, and FIG. 12B depicts an application introduction screen in accordance with a priority determined in the priority determination processing A; and FIGS. 13A and 13B depict a display example of an application introduction screen in accordance with a priority determined in the priority determination processing B, in which FIG. 13A depicts an upper half of the application introduction screen, and FIG. 13B depicts a lower half of the application introduction screen.

DETAILED DESCRIPTION

Hereinafter, an illustrative embodiment of the disclosure will be described with reference to the drawings. Incidentally, the illustrative embodiment to be described later is just an example of the disclosure, and the illustrative embodiment of the disclosure can be appropriately changed without changing the gist of the disclosure. For example, an execution sequence of each processing to be described later can be appropriately changed without changing the gist of the disclosure.

Figure 1:
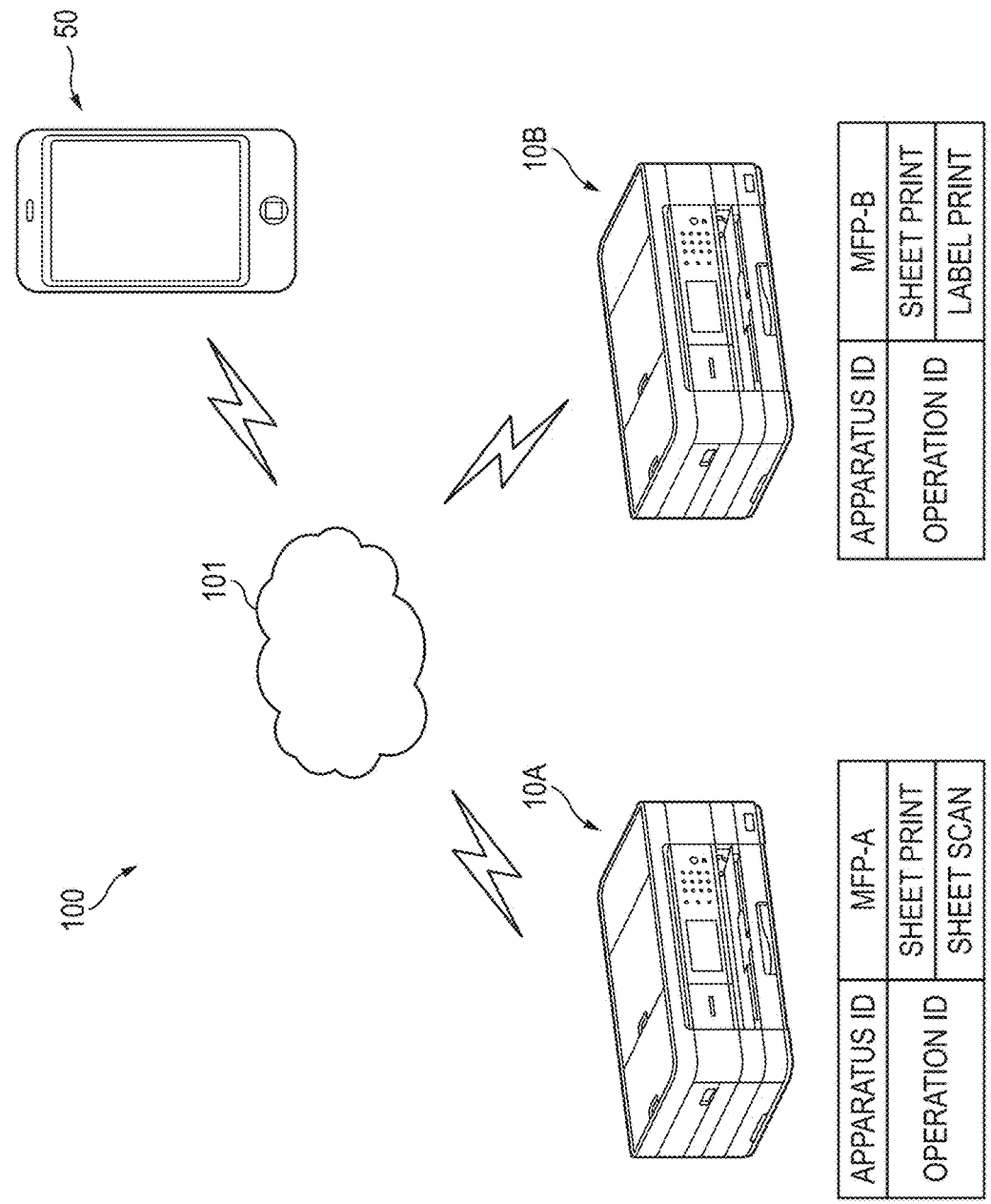
FIG. 1 is a schematic view of a system 100 in accordance with an illustrative embodiment.

FIG. 1 is a schematic view of a system 100 in accordance with an illustrative embodiment. The system 100 shown in FIG. 1 includes MFPs 10A, 10B (which may also be collectively referred to as "MFP 10", in the below) and a portable device 50. The MFP 10 and the portable device 50 are configured to perform communication with each other via a communication network 101. The communication network 101 may be a wired LAN, a wireless LAN or a combination thereof, for example. Alternatively, the MFP 10 and the portable device 50 may be connected to each other via a USB cable or the like.

Figure 2A:
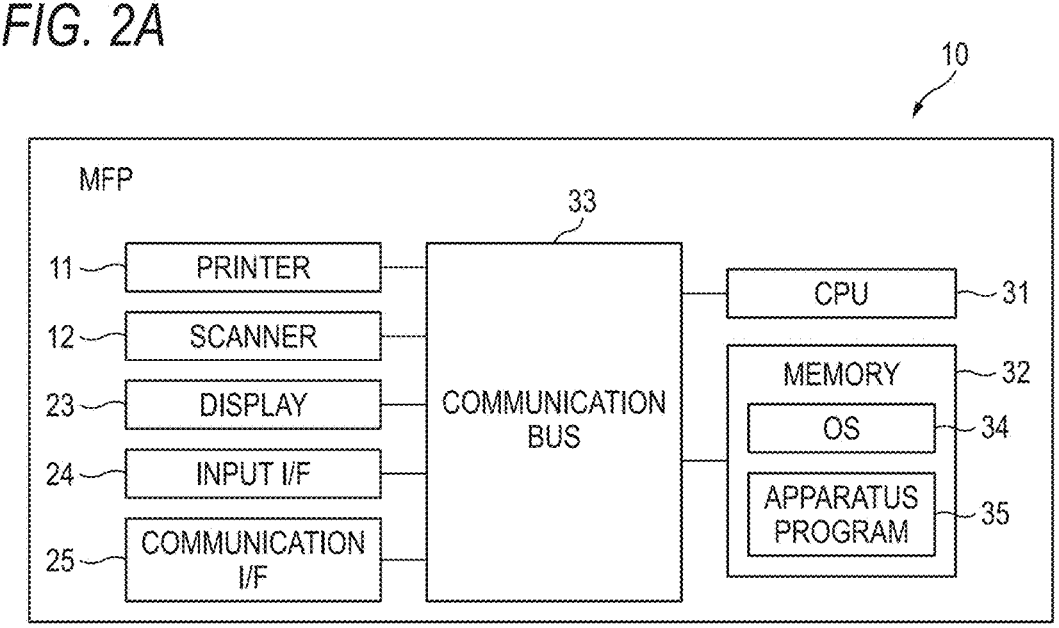
FIG. 2A is a block diagram of an MFP 10.

As shown in FIG. 2A, the MFP 10 mainly has a printer 11, a scanner 12, a display 23, an input I/F 24, a communication I/F 25, a CPU 31, a memory 32 and a communication bus 33. The respective constitutional elements configuring the MFP 10 are connected to each other through the communication bus 33. The MFP 10 is an example of the image processing apparatus.

The printer 11 is hardware configured to execute a print operation of recording an image expressed by image data onto a medium to be recorded. In the illustrative embodiment, the inkjet-type printer 11 configured to record an image by ejecting inks is exemplified. However, the recording method of the printer 11 may also be an electrophotographic method. The scanner 12 is hardware configured to execute a scan operation of reading an image recorded on a document and generating image data (hereinafter, referred to as "scan data"). The print operation and the scan operation are examples of the image processing operation. The print operation is an example of the first operation, and the scan operation is an example of the second operation.

Incidentally, the specific example of the image processing operation is not limited to the above operations. The image processing operation may be a FAX transmission operation of FAX transmitting image data to an external apparatus in accordance with a FAX protocol, a FAX receiving operation of FAX receiving image data from an external apparatus in accordance with the FAX protocol, and the like, for example. Also, the MFPs 10A, 10B may be configured to execute at least one operation. Also, the operations that the MFPs 10A, 10B can execute may be different.

The printer 11 is configured to execute the print operation in accordance with a predetermined execution condition. The execution condition of the print operation is specified by a plurality of condition parameters corresponding to each of a plurality of items (for example, "size", "sheet type" and "color"). The item "size" indicates a size (for example, "A4", "B5", "L size", "postcard" and the like) of a sheet to which an image is to be recorded. The item "sheet type" indicates a type (for example, "normal sheet", "glossy sheet" and the like) of a sheet to which an image is to be recorded. The item "color" indicates a gradation (for example, "color" and "monochrome") of a sheet to which an image is to be recorded.

Also, the print operation includes a sheet print operation of recording an image to a recording sheet, which is an example of the medium to be recorded, and a label print operation of recording an image to a surface of a label (for example, CD-ROM, DVD-ROM, and the like), which is an example of the medium to be recorded. That is, the printer 11 of the MFP 10 capable of executing the label print operation has hardware configured to convey not only a recording sheet but also a label to a recording position at which an image is to be recorded to the medium to be recorded.

The scanner 12 is configured to execute the scan operation in accordance with a predetermined execution condition. The execution condition of the scan operation is specified by a plurality of condition parameters corresponding to each of a plurality of items (for example, "resolution", "color" and "format"). The item "resolution" indicates a reading resolution (for example, "300 dpi", "600 dpi", and the like) upon reading of an image recorded on a document. The item "color" indicates a gradation (for example, "monochrome", "256color", "full color", and the like) of a color of the read image. The item "format" indicates a file format (for example, "PDF", "TIFF", "JPEG", and the like) of scan data.

Also, the scan operation includes a sheet scan operation of reading an image recorded on a recording sheet to generate scan data, and a label scan operation of reading an image recorded on a label to generate scan data. That is, the MFP 10 capable of executing the label scan operation has an image processing function of specifying a center position of a label on an image expressed by scan data.

The display 23 is a liquid crystal monitor, an organic EL display or the like, and has a display surface for displaying a variety of information.

The input I/F 24 is a user interface configured to receive a user's input operation. Specifically, the input I/F 24 has buttons and is configured to output a variety of operation signals associated with the pushed buttons to the CPU 31. In addition, the input I/F 24 may have a touch sensor having a film shape and superimposed on the display surface of the display 23. An operation of designating an object displayed on the display surface of the display 23 and an operation of inputting a character string or a number string are examples of the user operation. The "object" includes a character string, an icon, a button, a link, a radio button, a check box, a pull-down menu and the like displayed on the display 23, for example.

The input I/F 24 implemented as a touch sensor is configured to output position information indicative of a position on the display surface touched by the user. Meanwhile, in the specification, the "touch" includes all operations of bringing an input medium into contact with the display surface. Also, although the input medium is not in contact with the display surface, "hover" or "floating touch" of bringing the input medium close to a position at which a distance between the input medium and the display surface is very small may be included in the concept of the "touch." Also, the input medium may be a user's finger, a touch pen or the like. A user operation of tapping a position of an icon displayed on the display 23 is an example of the user operation of designating the icon.

The communication I/F 25 is an interface capable of performing communication with an external apparatus through the communication network 101. That is, the MFP 10 is configured to transmit a variety of information to the external apparatus through the communication I/F 25 and to receive a variety of information from the external apparatus through the communication I/F 25. Although a specific communication protocol of the communication I/F 25 is not particularly limited, Wi-Fi (registered trademark) can be adopted, for example. Also, when the MFP 10 and the portable device 50 are connected to each other by a USB cable or the like, the communication I/F 25 may be a USB interface to which the USB cable is to be detachably mounted.

The CPU 31 is configured to control overall operations of the MFP 10. The CPU 31 is configured to obtain and execute a variety of programs (which will be described later) from the memory 32, based on a variety of information output from the input I/F 24 and a variety of information received from the external apparatus through the communication I/F 25. The CPU 31 and the memory 32 configure an example of the controller.

In the memory 32, an OS 34 and an apparatus program 35 are stored. The apparatus program 35 may be a single program or a set of a plurality of programs. Also, in the memory 32, data or information necessary to execute the apparatus program 35 is stored. The memory 32 is configured by a RAM, a ROM, an EEPROM, an HDD, a portable storage medium such as a USB memory to be detachably mounted to the MFP 10, a buffer of the CPU 31 or a combination thereof, for example.

The memory 32 may be a computer-readable storage medium. The computer-readable storage medium is a non-transitory medium. The non-transitory medium includes a recording medium such as a CD-ROM and a DVD-ROM as well as the above-described media. Also, the non-transitory medium is a tangible medium. Incidentally, an electric signal for carrying a program to be downloaded from a server or the like on the Internet is a computer-readable signal medium, which is a kind of the computer-readable medium, but is not included in the non-transitory computer-readable storage medium. This also applies to the memory 62 of the portable device 50, which will be described later.

An MIB (abbreviation of Management Information Base) of the memory 32 stores apparatus information shown in FIG. 1. The apparatus information includes an apparatus ID for identifying the MFP 10, and an operation ID for identifying an image processing operation that can be executed by the MFP 10. Incidentally, a format of the "apparatus ID" such as a text format, a binary format and the like is not particularly limited inasmuch as it is possible to uniquely identify the MFPs 10A, 10B on the communication network 101. This also applies to the operation ID.

That is, the MFP 10A that is identified with an apparatus ID "MFP-A" can execute the sheet print operation and the sheet scan operation that are identified with operation IDs "sheet print" and "sheet scan". Incidentally, the MFP 10B that is identified with an apparatus ID "MFP-B" can execute the sheet print operation and the label print operation that are identified with operation IDs "sheet print" and "label print".

Figure 2B:
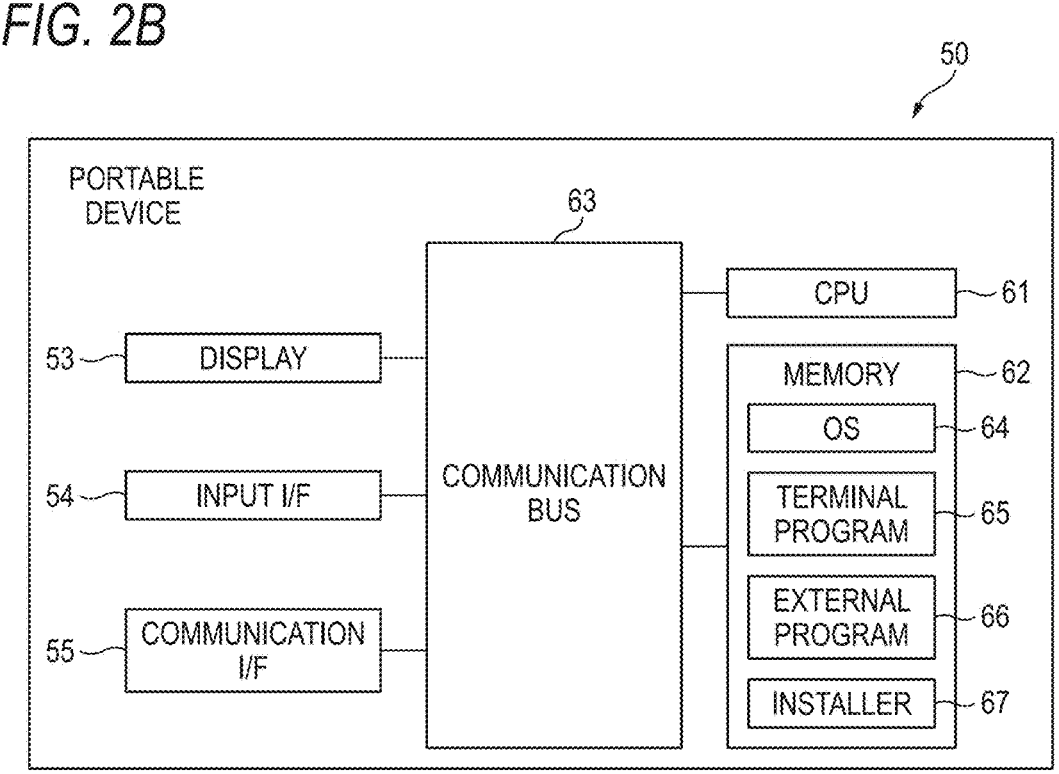
FIG. 2B is a block diagram of a portable device 50.

As shown in FIG. 2B, the portable device 50 mainly has a display 53, an input I/F 54, a communication I/F 55, a CPU 61, a memory 62 and a communication bus 63. Since the display 53, the input I/F 54, the communication I/F 55, the CPU 61, the memory 62 and the communication bus 63 included in the portable device 50 have the configurations similar to the display 23, the input I/F 24, the communication I/F 25, the CPU 31, the memory 32 and the communication bus 33 included in the MFP 10, the descriptions thereof are omitted. The CPU 61 and the memory 62 configure an example of the controller.

The portable device 50 may be a portable phone, a smart phone, a tablet terminal, or the like, for example. More specifically, the display 53 of the portable device 50 preferably has a display screen size of 12 inch or less, and more preferably 8 inch or less. Also, the input I/F 54 of the portable device 50 is preferably a touch sensor superimposed on the display surface of the display 53. The memory 62 is configured to store therein an OS 64, a terminal program 65, one or more external programs 66, and an installer 67.

The OS 64 may be Android (registered trademark) OS, iOS (registered trademark), Windows Phone (registered trademark) Operating System or the like, for example. The OS 64 can execute a plurality of programs installed in the portable device 50 in parallel. The plurality of programs is virtually executed in parallel by a time-division multiplex method, for example. Also, the OS 64 is configured to execute one of the plurality of programs, which are to be executed in parallel, at the foreground and to execute the other programs at the background.

The foreground is a state where a screen associated with execution of the program is displayed in most of a display region of the display 53, for example. The background is a state where a screen associated with execution of another program, which is different from said program, is displayed in most of the display region of the display 53, for example. That is, the portable device 50 can display on the display 53 only a screen associated with execution of a program, which is being executed at the foreground, of the plurality of programs being executed in parallel.

The terminal program 65 is a program configured to enable the MFP 10 connected via the communication I/F 55 to execute the image processing operation. More specifically, the terminal program 65 enables a user to designate operation specifying information (for example, designated apparatus information, a designated operation ID, a designated data ID, and designated condition information, which will be described later) and enables the MFP 10 to execute the image processing operation in accordance with contents specified by the designated operation specifying information. Incidentally, the terminal program 65 of the illustrative embodiment can enable the MFP 10 to execute the sheet print operation and the sheet scan operation, which are examples of the correspondence operation, and cannot enable the MFP 10 to execute the label print operation and the label scan operation, which are examples of the non-correspondence operation.

Also, the terminal program 65 can activate the external program 66 installed in the portable device 50. The terminal program 65 is configured to designate, as an argument, a program ID of the external program 66, for example, and to execute an API (hereinafter, referred to as "activation API") that is provided by the OS 64. As the activation API is executed, the OS 64 activates the external program 66 identified with the designated program ID. Incidentally, the terminal program 65 may activate the external program 66 in a so-called plug-in manner or may activate the external program 66 by a sharing function that is provided by the OS 64.

The external program 66 is a program configured to operate in the portable device 50, like the terminal program 65. Also, the external program 66 is a program that is separate from the terminal program 65 and can be independently executed. That is, the external program 66 is different from a subroutine of the terminal program 65. Also, the external program 66 activated by the terminal program 65 may be configured to execute a predetermined operation, and to provide an execution result thereof to the terminal program 65, as a return value of the activation API or to complete the processing without providing an execution result of the operation to the terminal program 65.

In the illustrative embodiment, as specific examples of the external program 66, a greeting card application, a cooperation application, a mail print application, a PDF conversion application, a label application, and a print dedicated application are described. However, the specific examples of the external program 66 are not limited thereto. The external program 66 includes a program having a function, which is not provided in the terminal program 65, a program capable of simply implementing a function provided in the terminal program 65, a program having a function, which is implemented in more detail than a function provided in the terminal program 65, and the like, for example.

The greeting card application is the external program 66 specialized to enable the MFP 10 to execute the sheet print operation of editing an image (hereinafter, referred to as "communication surface image"), which is to be recorded on a communication surface of a postcard (e.g., a greeting card such as a new year's card), in accordance with an instruction of a user, and recording the edited communication surface image to the communication surface of the postcard. The greeting card application has more variations (for example, synthesis of a photograph, addresser information and any character string to a template image) of an instruction to edit the communication surface image than the terminal program 65, for example.

The cooperation application is the external program 66 specialized to enable a first apparatus and a second apparatus to operate in cooperation, which are designated in advance by the user, of the plurality of MFPs 10 with which it is possible to perform communication via the communication I/F 55. The cooperation application can enable the first apparatus to execute the sheet scan operation, and enable the second apparatus to execute the sheet print operation of obtaining scan data generated in the sheet scan operation from the first apparatus and targeting at the scan data obtained from the first apparatus, for example. That is, the cooperation application has an independent user interface for enabling the user to designate the plurality of MFPs 10 enabled to operate in cooperation.

The mail print application is the external program 66 specialized to enable the MFP 10 to execute the sheet print operation of obtaining a mail to a predetermined account from a mail server and targeting at the obtained mail. The mail print application has more types of domains of a mail to be acquirable than the terminal program 65, for example. Also, the mail print application has more messages and helps, which are to be used when an error occurs, than the terminal program 65, for example.

The PDF conversion application is the external program 66 having a function of converting data, which is a target of the sheet print operation, from a PDF format to a JPEG format. The PDF format is an example of the first format, and the JPEG format is an example of the second format. The "conversion of format" indicates processing (hereinafter, referred to as "conversion processing") of changing a data format from a PDF format to a JPEG format without substantially changing a content of an image to be expressed by data of the PDF format, for example.

The conversion processing can also be executed by a conversion server (not shown) on the Internet. However, the conversion server can execute the conversion processing only for data of which a data size is smaller than a predetermined data size (e.g., 50 MB). Incidentally, the PDF conversion application has no such limit. The data size 50 MB is an example of the threshold size. Also, the limit of the conversion processing that is to be executed by the conversion server may be the number of pages (for example, 20 pages) included in data of a PDF format, in addition to the data size.

The label application is the external program 66 specialized to enable the MFP 10 to execute the label print operation and the label scan operation. The label application enables the MFP 10 to execute the label print operation of obtaining scan data generated by the label scan operation from the MFP 10, editing the obtained scan data in accordance with an instruction of the user, and targeting at the edited scan data. That is, the label application can instruct the MFP 10 to execute the label print operation and the label scan operation, which are the non-correspondence operations of the terminal program 65.

The print dedicated application is the external program 66 specialized to enable the MFP 10 to execute the sheet print operation. More specifically, the print dedicated application is a program capable of instructing the MFP 10 to execute only the sheet print operation of a plurality of image processing operations. The print dedicated application has less user operations, which are necessary to enable the MFP 10 to execute the sheet print operation with a default execution condition (for example, size "A4", sheet type "normal sheet", and color "color"), than the terminal program 65, for example. Also, the print dedicated application has more variations (for example, the number of items, and the number of parameters of each item) of a designable execution condition than the terminal program 65, for example.

The installer 67 is a program for installing the external program 66 into the portable device 50. The installer 67 is configured to download an execution file of the designated external program 66 from a server on the Internet, and to store the downloaded execution file in a predetermined region of the memory 62, for example. Since the functions provided in the installer 67 are well-known, the detailed descriptions thereof are omitted.

As shown in FIG. 3, for example, the memory 62 can store therein a program list. The program list includes one or more program records. The program record is stored in the memory 62 upon the install of the terminal program 65, for example. The program record corresponds to one of the plurality of external programs 66 that can be activated by the terminal program 65. The program record is an example of a set including an application ID, function information, install information, and extraction condition information.

The application ID, the function information, and the extraction condition information are information predetermined by a developer of the terminal program 65, for example. Incidentally, the install information is information that is set in S23 or the like (which will be described later) by the OS 64 or the terminal program 65, for example. Also, the program record may include a plurality of extraction condition information.

The application ID is an example of the program identification information for identifying the external program 66 that can be activated by the terminal program 65. That is, the greeting card application is identified with an application ID "greeting card", the cooperation application is identified with an application ID "cooperation", the mail print application is identified with an application ID "mail print", the PDF conversion application is identified with an application ID "PDF conversion", the label application is identified with an application ID "label", and the print dedicated application is identified with an application ID "print dedicated".

The function information indicates an image processing operation that the external program 66, which is identified with the application ID, can instruct the MFP 10 to execute. That is, the function information includes an operation ID of the image processing operation that the external program 66 can instruct the MFP 10 to execute. Also, the image processing apparatus that can be instructed by the external program 66 may be one or more.

The install information is information indicating whether the external program 66 identified with the application ID is installed in the portable device 50. For the install information of the illustrative embodiment, "not installed" indicating that the external program 66 has not been installed in the portable device 50, "installed" indicating that the external program 66 has been installed in the portable device 50 or "uninstalled" indicating that the external program 66 installed once in the portable device 50 has been already uninstalled is set.

The extraction condition information indicates a condition for introducing the external program 66, which is identified with the application ID, through an application introduction screen (which will be described later). The extraction condition information indicates a degree of importance, an extraction condition, and a recommendation reason. The degree of importance indicates a level of necessity for introducing the external program 66 to the user, for example. The extraction condition indicates a condition for introducing the external program 66 through the application introduction screen. The extraction condition indicates types and number of history included in history information (which will be described later), for example. The extraction condition will be described in detail later. The recommendation reason is a text indicative of a reason to introduce the external program.

For the degree of importance, the highest value "high", the second highest value "middle" or the lowest value "low" is set, for example. As an example, the setting value "high" is set for the degree of importance of the external program 66 (for example, the mail print application, and the PDF conversion application) that can solve an error having occurred during the processing of the terminal program 65. As another example, the setting value "middle" is set for the degree of importance of the external program 66 (for example, the label application) that can instruct the non-correspondence operation of the terminal program 65. As another example, the setting value "low" is set for the degree of importance of the external program 66 (for example, the greeting card application, the cooperation application, and the print dedicated application) specialized to the correspondence operation of the terminal program 65.

As an example, the extraction condition "sheet size=postcard" corresponds to history information indicating that the sheet print operation is instructed to be executed in accordance with the execution condition including the parameter "postcard" of the item "size". The item "size" is an example of the specific item, and the parameter "postcard" is an example of the specific parameter. The specific parameter "postcard" of the specific item "size" is a parameter that should not be changed when the greeting card application enables the designated apparatus to execute the sheet print operation, for example. The specific item and the specific parameter are determined in advance for each external program 66, and are defined in a source code or setting file of the external program 66, for example. That is, the specific item and the specific parameter may be different for each external program 66. Also, the specific item and the specific parameter may be provided in plural number.

As another example, the extraction condition "print and scan are executed with separate devices" corresponds to history information indicating that the sheet print operation and the sheet scan operation are instructed to the different MFPs 10. As another example, the extraction condition "login error" corresponds to history information indicating that false account information (for example, a combination of an account and a password) is input to a login screen of a mail server (not shown) on the Internet. As another example, the extraction condition "size error" indicates that the conversion server is instructed to execute the conversion processing of data of 50 MB or larger.

As another example, the extraction condition "server conversion=5 times" corresponds to history information indicating that the conversion processing is instructed to the conversion server five times. As another example, the extraction condition "label corresponding device" corresponds to history information indicating that the MFP 10 capable of executing the label print operation or the label scan operation is designated as the designated apparatus. As another example, the extraction condition "number of print times=5 times" corresponds to history information indicating that the sheet print operation is instructed to the MFP 10 five times.

Also, although not shown, the memory 62 may be configured to store therein designated apparatus information. The designated apparatus information is apparatus information stored in the MIB of the MFP 10 designated in device selection processing, which will be described later. In the below, the apparatus ID included in the designated apparatus information is referred to as "designated apparatus ID", and the MFP 10 identified with the designated apparatus ID is referred to as "designated apparatus", depending on situations. Incidentally, when the MFP 10 is not designated, the designated apparatus information is not stored in the memory 62. The designated apparatus information is an example of the operation specifying information.

Also, although not shown, the memory 62 may be configured to store therein designated condition information. The designated condition information indicates the execution condition of the image processing operation. That is, in the memory 62, the designated condition information of each of the sheet print operation and the sheet scan operation, which are the correspondence operations, is stored. The terminal program 65 can edit the designated condition information in accordance with an instruction of the user, in S90 and S91 (which will be described later). The designated condition information is an example of the operation specifying information.

Also, although not shown, the memory 62 may be configured to store therein history information. The history information is information indicating that the user has designated the operation specifying information, that the designated apparatus has been instructed to execute the image processing operation, and the like. The terminal program 65 stores the history information in the memory 62 in S35, S85, S96, and S97, for example. The history information is information that is accumulated in the memory 62 as the processing shown in FIGS. 4 to 8 is repetitively executed.

Also, although not shown, the memory 62 stores therein a device change flag. The device change flag is information indicating whether the designated apparatus has been switched up to now after a main screen (which will be described later) has been recently displayed. For the device change flag, a first value "ON" indicating that the designated apparatus has been switched after the main screen has been recently displayed or a second value "OFF" indicating that the designated apparatus has not been switched after the main screen has been recently displayed is set. An initial value of the device change flag is the second value "OFF".

Also, although not shown, the memory 62 stores therein a plurality of reason flags in association with each of the plurality of external programs 66 registered in the program list. The reason flag is information indicating whether a recommendation reason is to be described on an application icon corresponding to the external program 66 in an application introduction screen (which will be described later). For the reason flag, a third value "ON" corresponding to a case that the recommendation reason is to be described and a fourth value "OFF" corresponding to a case that the recommendation reason is not to be described is set. An initial value of the reason flag is the fourth value.

Also, although not shown, the memory 62 may be provided with a data folder. In the data folder, photograph data, document data, presentation data, table calculation data and the like may be stored. The diverse data stored in the data folder is data that can be a target of the print operation.

(Operations of System 100)

The operations of the system 100 of the illustrative embodiment are described with reference to FIGS. 4 to 8. Incidentally, it is assumed that upon start of main processing shown in FIG. 4, the designated apparatus information and the history information have not been stored in the memory 62. Also, it is assumed that the greeting card application, the PDF conversion application, and the label application have not been installed yet in the portable device 50, the cooperation application and the mail print application have been installed, and the print dedicated application has been already uninstalled.

A flowchart of the specification basically indicates processing that is to be executed by the CPUs 31, 61 in accordance with commands described in the program. That is, in the below descriptions, the processing of "determination", "extraction", "selection", "calculation", "determining", "specifying", "control" and the like indicates the processing of the CPUs 31, 61. The processing that is to be executed by the CPUs 31, 61 includes hardware controls through the OSs 34, 64, too. Also, in the specification, "data" is expressed by a bit string that can be read by a computer. The data having substantially the same meaning and the different formats is handled as the same data. This also applies to the "information" of the specification.

First, the OS 64 of the portable device 50 displays a menu screen (not shown) on the display 53. The menu screen includes program icons corresponding to the programs installed in the portable device 50. That is, the menu screen is displayed thereon with at least program icons corresponding to the terminal program 65, the cooperation application, and the mail print application. Then, the OS 64 receives a user operation on the menu screen, through the input I/F 54.

As an example, the OS 64 activates the cooperation application and [0075] executes the cooperation application at the foreground, in response to a designation of the program icon corresponding to the cooperation application being received via the input I/F 54. As another example, the OS 64 activates the terminal program 65 and executes the terminal program 65 at the foreground, in response to a designation of the program icon corresponding to the terminal program 65 being received via the input I/F 54. In the below, the processing that is executed when the program icon corresponding to the terminal program 65 is designated is described.

(Main Processing)

Figure 4:
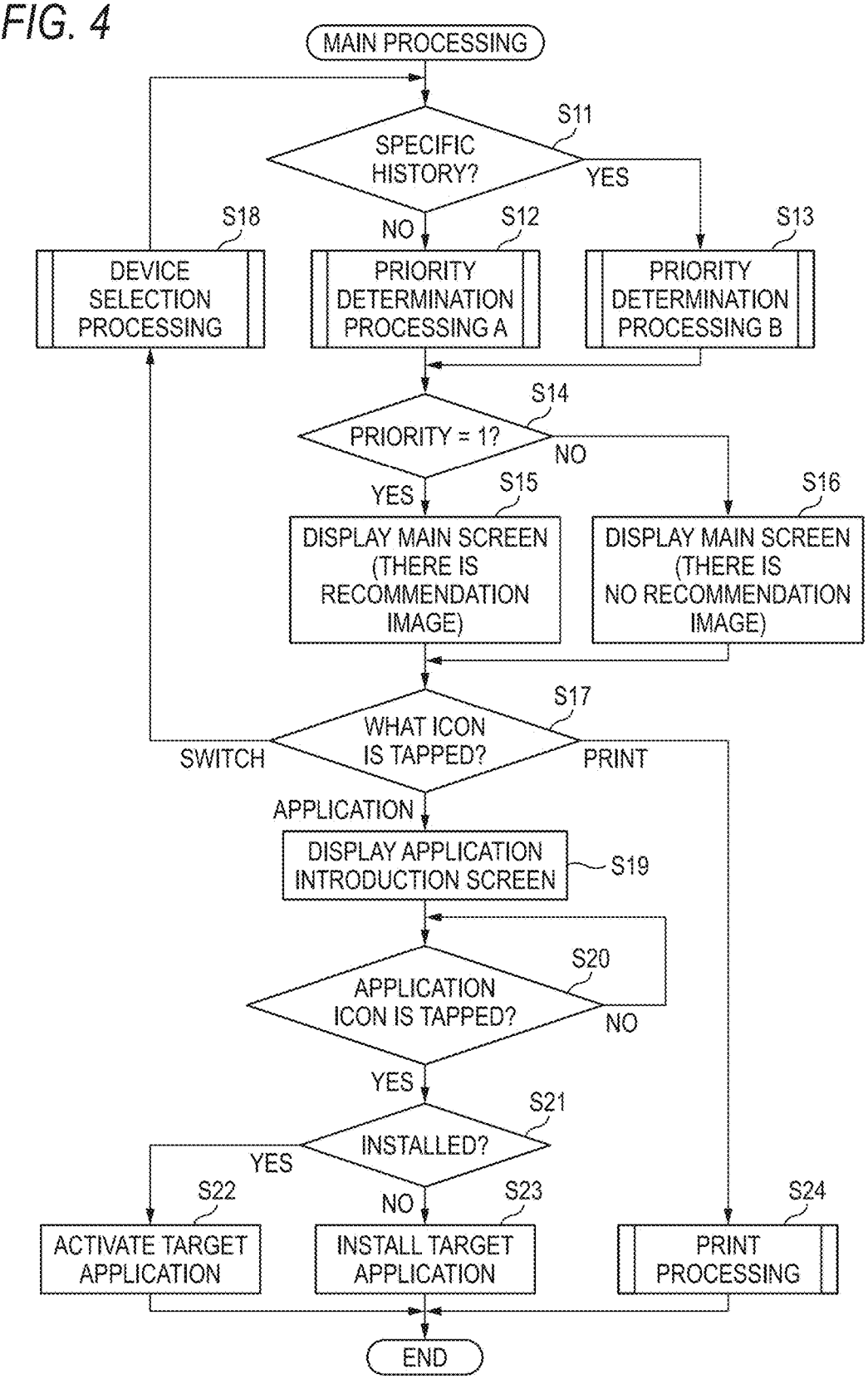
FIG. 4 is a flowchart of main processing.
Figure 5:
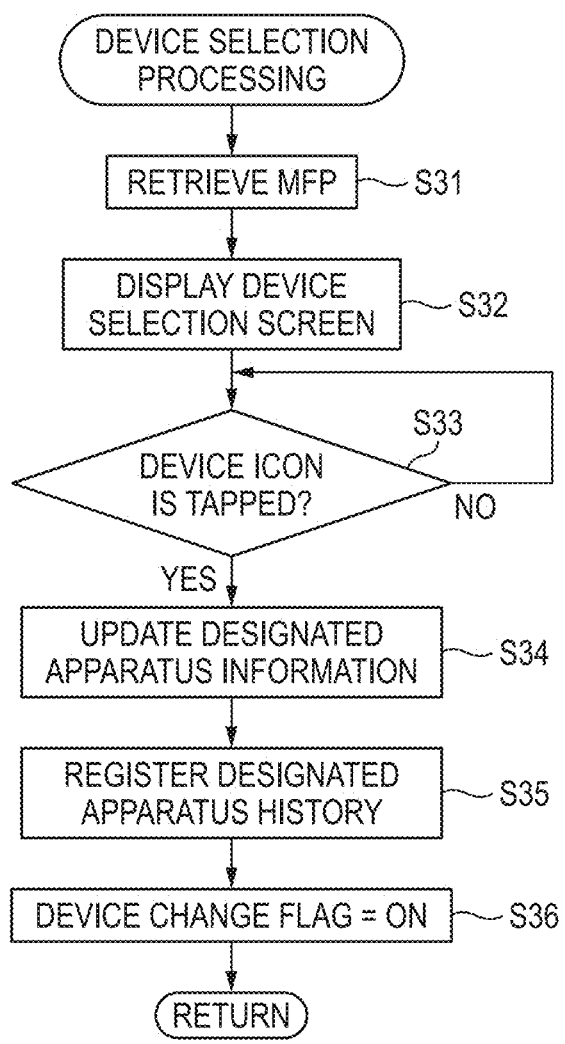
FIG. 5 is a flowchart of device selection processing.

When activated by the OS 64, the terminal program 65 executes main processing shown in FIG. 4. First, the terminal program 65 determines whether the history information includes a specific history (S11). The specific history indicates an error history, which is stored in the memory 62 in S85 and S97, and an operation history, which is stored in the memory 62 in S96. Incidentally, the specific history of the illustrative embodiment does not include a designated apparatus history, which is stored in the memory 62 in S35.

When it is determined that the history information does not include the specific history (S11: No), the terminal program 65 executes priority determination processing A (S12), which will be described later with reference to FIG. 6. On the other hand, when it is determined that the history information includes the specific history (S11: Yes), the terminal program 65 executes priority determination processing B (S12), which will be described later with reference to FIGS. 7A and 7B. The processing of S12 and S13 is an example of the extraction processing.

Then, the terminal program 65 determines whether there is the external program 66 for which a priority has been determined as "1" in the priority determination processing A, B (S14). When it is determined that there is the external program 66 for which a priority has been determined as "1" (S14: Yes), the terminal program 65 displays a main screen including a recommendation image 115 on the display 53, as shown in FIG. 9A. On the other hand, when it is determined that there is no external program 66 for which a priority has been determined as "1" (S14: No), the terminal program 65 displays a main screen not including a recommendation image 115 on the display 53 (S16). Then, the terminal program 65 receives a user operation on the main screen through the input I/F 54 (S17). The processing of S17 is an example of the first receiving processing.

The main screen includes operation icons 111, 112, a switch icon 113, and an <application> icon 114. In case that the designated apparatus information is not stored in the memory 62, the main screen includes an operation icon corresponding to the correspondence operation of the terminal program 65. That is, the operation icon 111 corresponds to an execution instruction of the sheet print operation, and the operation icon 112 corresponds to an execution instruction of the sheet scan operation. The switch icon 113 corresponds to a switching instruction of the designated apparatus. When the designated apparatus information is not stored in the memory 62, the switch icon 113 is described thereon with a character string "not selected" indicating that the designated apparatus has not been selected. The <application> icon 114 corresponds to a display instruction of the application introduction screen. The recommendation image 115 is an image for notifying that there is the external program 66 of the priority="1", and is displayed with being associated with the <application> icon 114.

Then, when a designation of the switch icon 113 is received through the input I/F 54 (S17: switch), for example, the terminal program 65 executes device selection processing (S18). The device selection processing is processing of switching the designated apparatus in accordance with an instruction of the user. The device selection processing is described in detail with reference to FIG. 5.

(Device Selection Processing)

First, the terminal program 65 retrieves the plurality of MFPs 10 with which it is possible to perform communication via the communication I/F 55 by using an SNMP (abbreviation of Simple Network Management Protocol) (S31), for example. Specifically, the terminal program 65 broadcasts transmission request information to the communication network 101 via the communication I/F 55. Then, the terminal program 65 receives the apparatus information, which is transmitted by the MFPs 10A, 10B in response to the transmission request information, through the communication I/F 55. That is, the terminal program 65 specifies the MFPs 10A, 10B, which are transmission sources of the apparatus information, as the communicable MFP 10. Incidentally, the method of retrieving the communicable MFP 10 may also be the other well-known method.

Then, the terminal program 65 displays a device selection screen (not shown) on the display 53 (S32). The device selection screen includes the device icons corresponding to the MFPs 10A, 10B retrieved in S31. Then, the terminal program 65 receives a user operation on the device selection screen through the input I/F 54 (S33). The tapping on the device icon is an example of the user operation of designating the operation specifying information.

When a designation of the device icon corresponding to the MFP 10A, for example, is received through the input I/F 54 (S33: Yes), the terminal program 65 stores the apparatus information received from the MFP 10A in the memory 62, as the designated apparatus information (S34). In case that the designated apparatus information has been already stored in the memory 62, the terminal program 65 overwrites the designated apparatus information with the new designated apparatus information. Then, the terminal program 65 stores a designated apparatus history (for example, the designated apparatus information), which indicates that the new designated apparatus has been designated, in the memory 62, as the history information (S35). The processing of S35 is an example of the storing processing. Also, the terminal program 65 sets the first value "ON" for the device change flag (S36).

Then, returning to FIG. 4, the terminal program 65 executes the processing of S11 to S16. After the device icon corresponding to the MFP 10A is designated, the terminal program 65 displays, on the display 53, the main screen including the operation icons 111, 112 corresponding to the sheet print operation and the sheet scan operation, which can be executed by the MFP 10A, the switch icon 113 on which the designated apparatus ID "MFP-A" is described, and the <application> icon 114 (S15, S16).

Then, when a designation of the operation icon 111, for example, is received through the input I/F 54 (S17: print), the terminal program 65 stores the operation ID "sheet print" of the sheet print operation associated with the operation icon 111 in the memory 62, as a designated operation ID, and executes the print processing (S24). The designated operation ID is an example of the operation specifying information. The image processing operation identified with the designated operation ID is an example of the designated operation. The tapping on the operation icon 111 is an example of the user operation of designating the operation specifying information. The print processing is processing of enabling the designated apparatus to execute the sheet print operation, which is the designated operation, and is one example of the operation instruction processing. The print processing is described in detail with reference to FIGS. 8A and 8B.

(Print Processing)

Figure 9B:
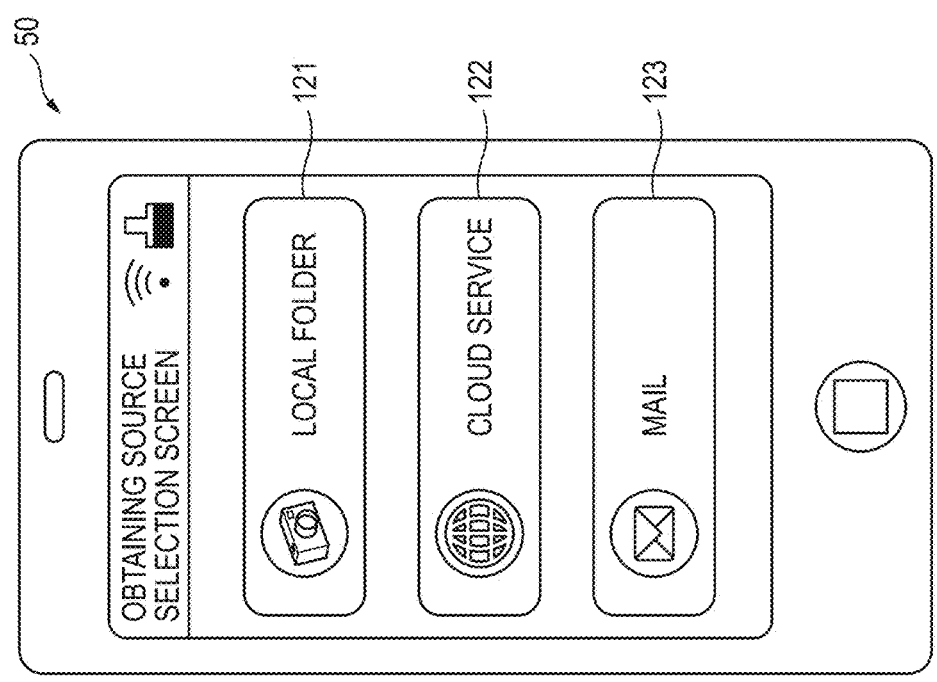
Figure 9A:
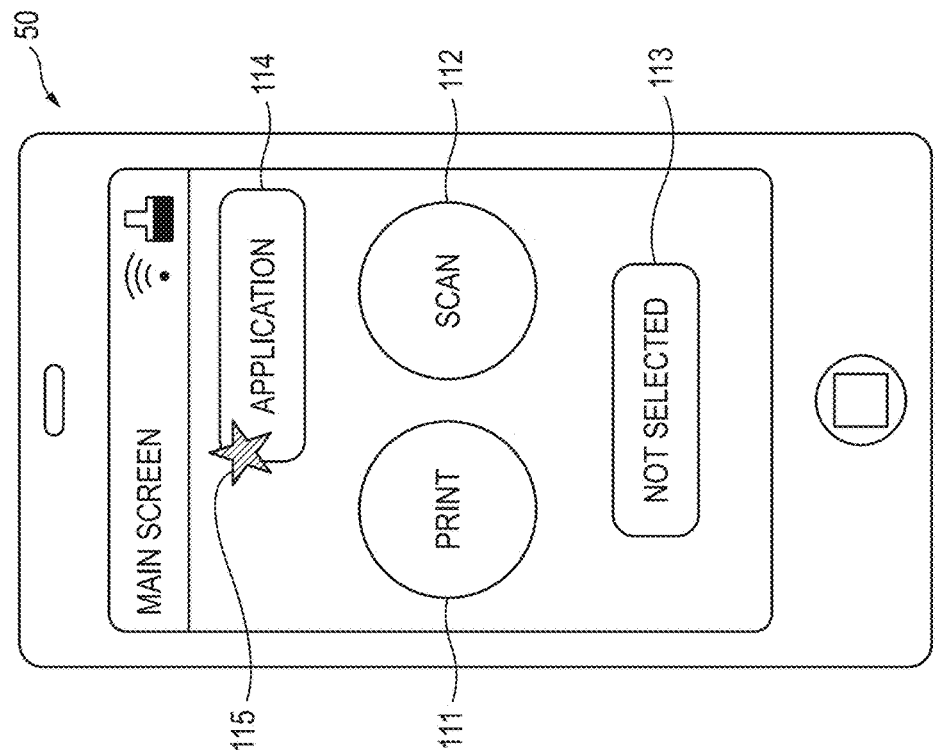

First, the terminal program 65 displays an obtaining source selection screen shown in FIG. 9B on the display 53 (S81). The obtaining source selection screen includes obtaining source icons 121, 122, 123 corresponding to obtaining sources of data, which is a target of the sheet print operation. The obtaining source icon 121 corresponds to the memory 62, the obtaining source icon 122 corresponds to a storage server (not shown) on the Internet, and the obtaining source icon 123 corresponds to a mail server (not shown) on the Internet. The terminal program 65 receives a user operation on the obtaining source selection screen through the input I/F 54 (S82). The processing of S82 is an example of the first receiving processing.

Figure 10A:
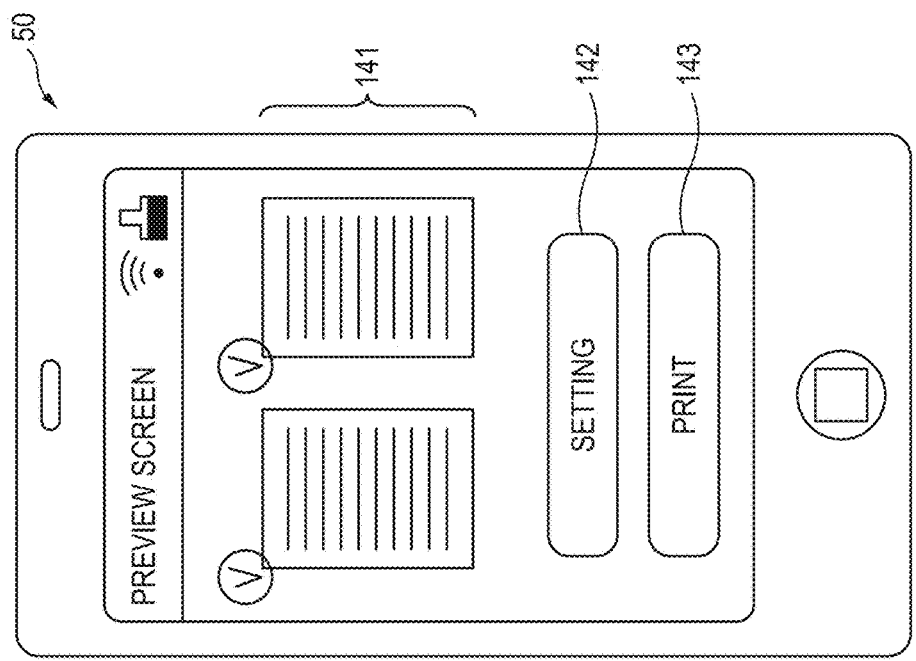

Then, when a designation of the obtaining source icon 121 is received through the input I/F 54 (S82: other), for example, the terminal program 65 skips over processing of S83 to S85, and displays a data selection screen shown in FIG. 10A on the display 53 (S86). The data selection screen includes data icons 131, 132, 133. Each of the data icons 131 to 133 corresponds to one of data stored in the memory 62. The terminal program 65 receives a user operation on the data selection screen through the input I/F 54 (S87). The processing of S87 is an example of the first receiving processing.

Figure 10B:
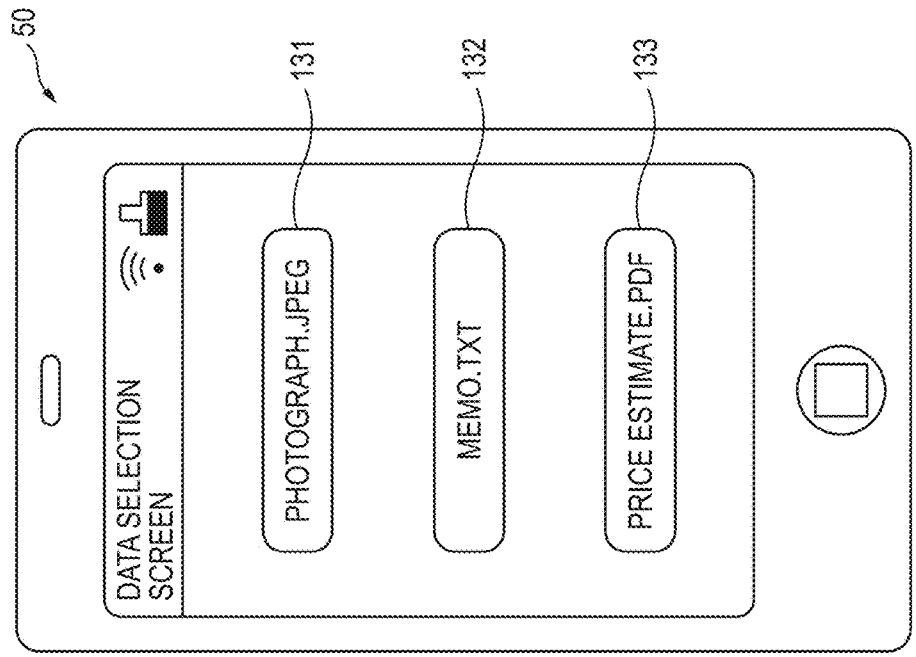

Then, for example, when a designation of the data icon 133 is received through the input I/F 54 (S87: Yes), the terminal program 65 temporarily stores data ID "price estimate.PDF" associated with the data icon 133 in the memory 62, as designated data ID. The designated data ID is an example of the operation specifying information. The tapping on the data icon 133 is an example of the user operation of designating the operation specifying information. Then, the terminal program 65 displays a preview screen shown in FIG. 10B on the display 53 (S88). Then, the terminal program 65 receives a user operation on the preview screen through the input I/F 54 (S89). The processing of S89 is an example of the first receiving processing.

The preview screen includes a preview image 141, a <setting> icon 142, and a <print> icon 143. The preview image 141 is an image indicating a state where an image expressed by the designated data "price estimate.PDF" identified with the designated data ID is recorded on the sheet in accordance with the execution condition indicated by the designated condition information of the sheet print operation. The <setting> icon 142 corresponds to an editing instruction of the designated condition information of the sheet print operation. The <print> icon 143 corresponds to the execution instruction of the sheet print operation.

Then, for example, when a designation of the <print> icon 143 is received through the input I/F 54 (S89: print), the terminal program 65 determines whether a data format of the designated data identified with the designated data ID is a PDF format (S92). When it is determined that the designated data "price estimate.PDF" has the PDF format (S92: Yes), the terminal program 65 determines a data size of the designated data (S93).

When it is determined that a data size of the designated data "price estimate.PDF" is smaller than 50 MB (S93: Yes), the terminal program 65 requests the conversion server to execute the conversion processing for the designated data "price estimate.PDF" (S94). More specifically, the terminal program 65 transmits conversion request information including the designated data "price estimate.PDF" to the conversion server through the communication I/F 55. Then, the terminal program 65 receives the designated data "price estimate.PDF" converted into a JPEG format from the conversion server through the communication I/F 55, as a response to the conversion request information. The processing of S94 is an example of the conversion processing.

Then, the terminal program 65 transmits print instruction information to the MFP 10A, which is the designated apparatus, through the communication I/F 55 (S95). The print instruction information is an example of the operation instruction information of instructing execution of the image processing operation in accordance with a content specified with the operation specifying information designated by the user. Here, the print instruction information includes the designated data "price estimate.PDF" converted into the JPEG format, and the designated condition information indicative of the execution condition of the sheet print operation. The processing of S95 is an example of the operation instruction processing.

Incidentally, although not shown, the apparatus program 35 of the MFP 10A, which is the designated apparatus, receives the print instruction information from the portable device 50 through the communication I/F 25. Then, the apparatus program 35 enables the printer 11 to execute a print operation in accordance with the received print instruction information. That is, the printer 11 records an image expressed by the designated data of the JPEG format on the sheet in accordance with the execution condition indicated by the designated condition information.

Then, the terminal program 65 stores an operation history (for example, the designated apparatus ID "MFP-A", the designated operation ID "sheet print", the designated data ID "price estimate.PDF", and the designated condition information), which indicates that the designated apparatus has been instructed to execute the designated operation in S95, in the memory 62, as the history information (S96). Also, when it is determined that the designated data of the PDF format is equal to or larger than 50 MB (S93: No), the terminal program 65 stores a size error history (for example, the designated data ID, and the data size of the designated data), which indicates that the PDF file of 50 MB or larger has been designated as the designated data, in the memory 62, as the history information (S97), instead of the processing of S94 to S96. The processing of S96 and S97 is an example of the storing processing.

Figure 11A:
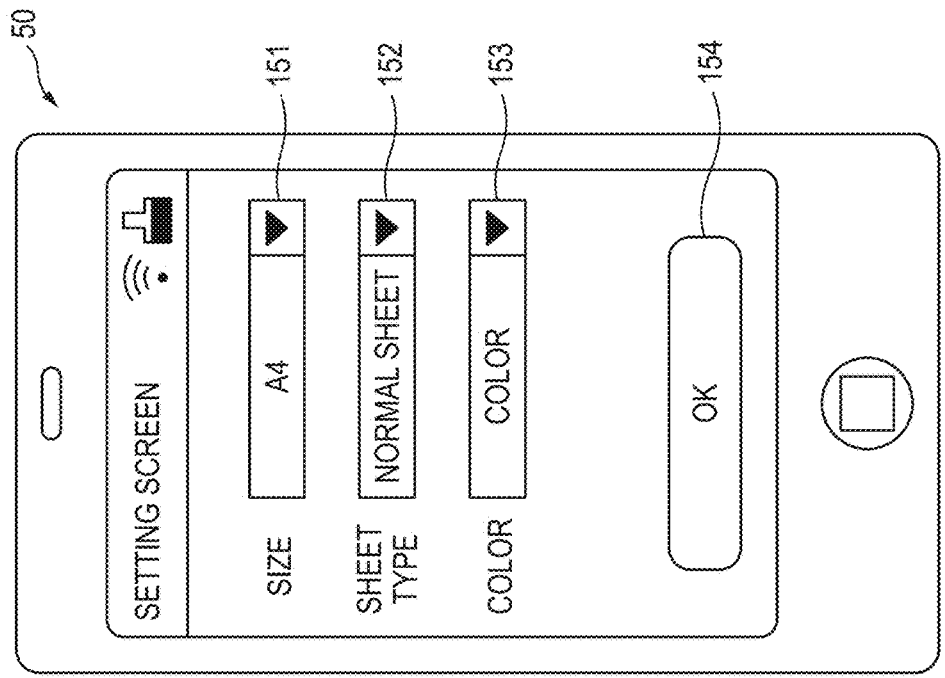

Also, when a designation of the data icon 131 on the data selection screen shown in FIG. 10A is received through the input I/F 54 (S87: Yes), the terminal program 65 temporarily stores a data ID "photograph.JPEG" associated with the data icon 131 in the memory 62, as the designated data ID. Then, the terminal program 65 displays a preview screen shown in FIG. 11A on the display 53 (S88). The preview screen shown in FIG. 11A is different from FIG. 10B, in that it includes a preview image 144 indicating a state where an image expressed by the designated data "photograph.JPEG" has been recorded on the sheet, but is the same as FIG. 10B in other respects.

Figure 11B:
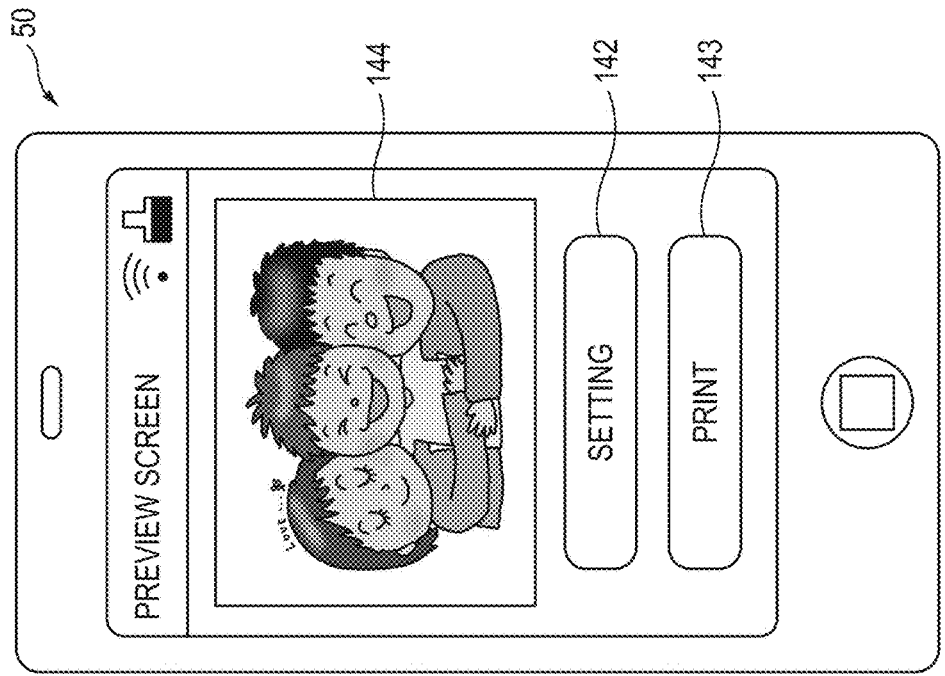

Then, for example, when a designation of the <setting> icon 142 is received through the input I/F 54 (S89: setting), the terminal program 65 displays a setting screen shown in FIG. 11B on the display 53 (S90). The setting screen includes pull-down menus 151, 152, 153, and an <OK> icon 154 corresponding to an instruction of confirming the execution condition. Then, the terminal program 65 receives a user operation on the setting screen through the input I/F 54 (S91). The processing of S91 is an example of the first receiving processing.

The pull-down menus 151 to 153 correspond to the plurality of items "size", "sheet type" and "color" configuring the execution condition of the sheet print operation, respectively. Each of the pull-down menus 151 to 153 is set to a state where one of a plurality of parameters, which can be designated with respect to the corresponding item, has been designated. The designated parameters "A4", "normal sheet", and "color" are displayed in the pull-down menus 151 to 153. In the setting screen upon the tapping on the <setting> icon 142, the parameters included in the designated condition information of the sheet print operation are displayed in the pull-down menus 151 to 153.

The pull-down menu 151 corresponding to the item "size" includes four options corresponding to candidates of the parameter "A4", "B5", "L size" and "postcard". The pull-down menu 152 corresponding to the item "sheet type" includes two options corresponding to candidates of the parameter "normal sheet" and "glossy sheet". The pull-down menu 153 item corresponding to the "color" includes two options corresponding to candidates of the parameter "color" and "monochrome".

For example, when a user operation of changing the parameters designated in the pull-down menus 151 to 153 is received through the input I/F 54, the terminal program 65 displays the changed parameters in the corresponding pull-down menus 151 to 153. Also, when a designation of the <OK> icon 154 is received through the input I/F 54 (S91: Yes), the terminal program 65 overwrites the parameters included in the designated apparatus information of the sheet print operation with the parameters displayed in the pull-down menus 151 to 153.

Then, the terminal program 65 executes the processing of S88 and thereafter. On the other hand, when it is determined that the designated data "photograph.JPEG" is not a PDF format (S92: No), the terminal program 65 skips over processing of S93 and S94, and transmits the print instruction information to the MFP 10A through the communication I/F 55 (S95). In this step, the print instruction information includes the designated data "photograph.JPEG", and the designated condition information of the sheet print operation. The other processing is common to the above description.

Figure 12A:
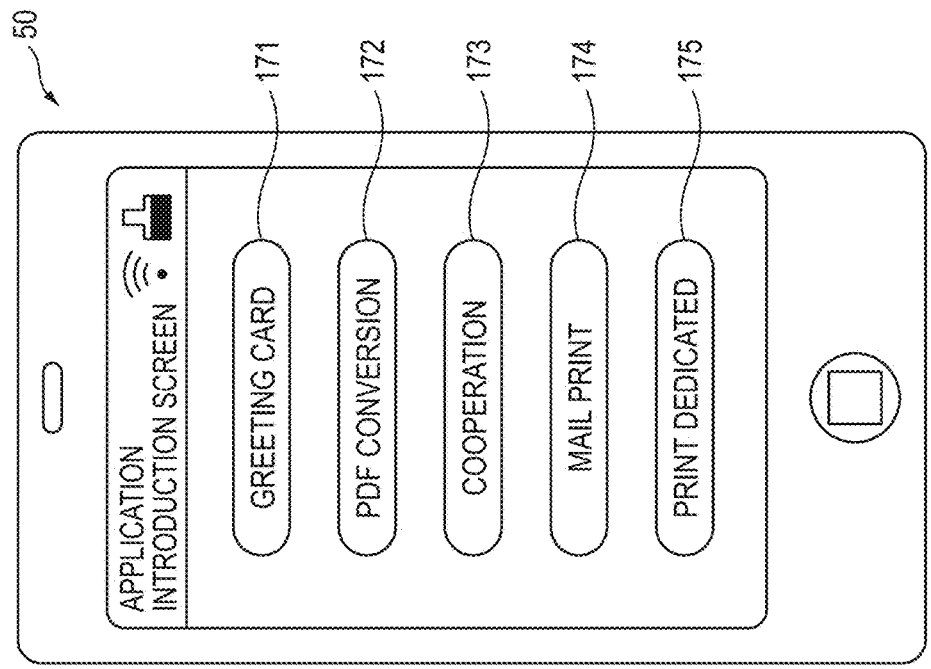

Also, when a designation of the obtaining source icon 123 on the obtaining source selection screen shown in FIG. 9B is received through the input I/F 54 (S82: mail), the terminal program displays a login screen shown in FIG. 12A on the display 53 (S83). The login screen includes a text box 161 for receiving an input of an account name, a text box 162 for receiving an input of a password, and an <login> icon 163. The terminal program 65 receives a user operation on the login screen through the input I/F 54 (S84).

Then, when inputs of an account name and a password are received through a software keyboard (not shown), for example, the terminal program 65 displays the input character strings in the text boxes 161, 162. Also, when a designation of the <login> icon 163 is received through the input I/F 54, the terminal program 65 transmits login request information including the input account information to the mail server through the communication I/F 55. Then, the terminal program 65 receives login success information, which indicates that the correct account information has been input, or login fail information, which indicates that the incorrect account information has been input, from the mail server through the communication I/F 55, as a response to the login request information.

When the login success information is received, the terminal program 65 displays a data selection screen including a data icon corresponding to a mail stored in the mail server on the display 53 (S86), instead of the processing of S85. The processing of S87 and thereafter is common to the above description. On the other hand, when the login fail information is received (S84: No), the terminal program 65 stores a login error history, which indicates that the login to the mail server has failed (in other words, it was not possible to obtain the designated data from the mail server), in the memory 62, as the history information (S85). The processing of S85 is an example of the storing processing. Then, the terminal program 65 executes the processing of S81 and thereafter.

Also, although not shown, when a designation of the operation icon 112 on the main screen shown in FIG. 9B is received through the input I/F 54, the terminal program 65 stores the operation ID "sheet scan" of the sheet scan operation associated with the operation icon 112 in the memory 62, as the designated operation ID. Then, the terminal program 65 executes the scan processing for enabling the designated apparatus to execute the sheet scan operation, which is the designated operation. Also, the terminal program 65 stores the history information, which indicates that the operation specifying information of the sheet scan operation has been designated by the user, the designated apparatus has been instructed to execute the sheet scan operation, and the like in the scan processing, in the memory 62.

Returning to FIG. 4, when a designation of the <application> icon 114 on the main screen shown in FIG. 9A is received through the input I/F 54 (S17: application), the terminal program 65 displays an application introduction screen on the display 53 (S19). The application introduction screen includes the application icons corresponding to the external programs 66 extracted in the priority determination processing A, B. Then, the terminal program 65 receives a user operation on the application introduction screen through the input I/F 54 (S20). The processing of S19 is an example of the display processing, and the processing of S20 is an example of the second receiving processing.

Then, for example, when a user operation of designating the application icon is received through the input I/F 54 (S20: Yes), the terminal program 65 determines whether the external program 66 (hereinafter, referred to as "target application") corresponding to the designated application icon has been already installed in the portable device 50 (S21). That is, the terminal program 65 may determine a setting value of the install information included in the program record of the target application. The processing of S21 is an example of the determination processing.

Then, when "installed" is set in the install information included in the program record of the target application (S21: Yes), the terminal program 65 activates the target application (S22). That is, the terminal program 65 designates the application ID for identifying the target application, as an argument, and activates the activation API. The processing of S22 is an example of the activation processing. Then, the OS 64 ends the terminal program 65, activates the target application, and executes the target application at the foreground.

On the other hand, when "not installed" or "uninstalled" is set in the install information included in the program record of the target application (S21: No), the terminal program 65 installs the target application in the portable device 50 (S23). More specifically, the terminal program 65 designates the application ID for identifying the target application, as an argument, and activates the installer 67. The processing of S23 is an example of the install processing. Then, the installer 67 activated by the terminal program 65 downloads an execution file of the target application from the server, and stores the downloaded execution file in a predetermined region of the memory 62. Then, the installer 67 sets "installed" in the install information corresponding to the target application ID.

(Priority Determination Processing A)

Figure 6:
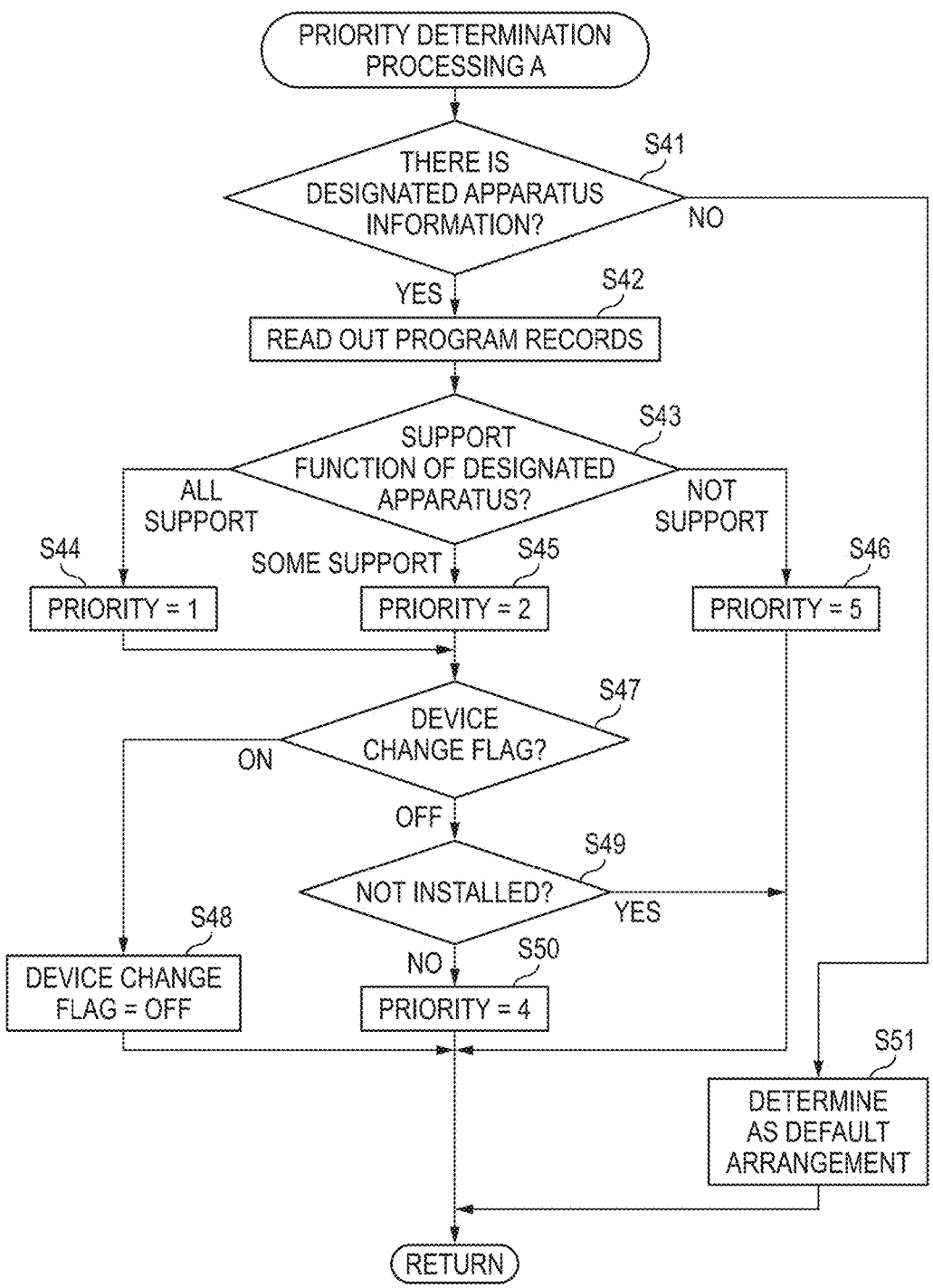
FIG. 6 is a flowchart of priority determination processing A.

The priority determination processing A shown in FIG. 6 is processing of determining a priority of each of the plurality of external programs 66 when the history information does not include the specific history. In the priority determination processing A, the priority is a parameter for determining whether or not to display the application icon corresponding to the external program 66 in the application introduction screen and determining a display order of the application icons. Incidentally, it is assumed that the priority "1" is highest and the priority "5" is lowest. In the below, the priority determination processing A is described in detail while assuming that the apparatus information of the MFP 10A is stored in the memory 62, as the designated apparatus information, and the second value "OFF" is set for the device change flag.

First, the terminal program 65 determines whether the designated apparatus information has been stored in the memory 62 (S41). When it is determined that the designated apparatus information has been stored in the memory 62 (S41: Yes), the terminal program 65 executes processing of S42 to S50 for each of the plurality of program records registered in the program list.

The terminal program 65 reads out all the program records registered in the program list (S42). Then, the terminal program 65 compares the image processing operation, which can be instructed by the external program 66 indicated by each of the read program records, and the image processing operation, which can be executed by the designated apparatus (S43). That is, the terminal program 65 compares the operation ID included in the function information of each of the read program records and the operation ID included in the designated apparatus information.

Since the function information of the program records including the application IDs "greeting card" and "cooperation" includes all the operation IDs included in the designated apparatus information (S43: all support), the terminal program 65 determines the priorities of the greeting card application and the cooperation application as "1" (S44). Also, since the function information of the program records including the application IDs "mail print", "PDF conversion" and "print dedicated" includes only the operation ID "sheet print" of the operation IDs included in the designated apparatus information (S43: some support), the terminal program 65 determines the priorities of the mail print application, the PDF conversion application, and the print dedicated application as "2" (S45). Also, since the function information of the program record including application ID "label" does not include any of the operation IDs included in the designated apparatus information (S43: not support), the terminal program 65 determines the priority of the label program as "5" (S46).

That is, the terminal program 65 sets the priority (S44) of the external program 66, which can instruct all the image processing operations that can be executed by the designated apparatus, higher than the priority (S45) of the external program 66, which can instruct only some of the image processing operations that can be executed by the designated apparatus. Also, the terminal program 65 sets the priority (S44, S45) of the external program 66, which can instruct at least some of the image processing operations that can be executed by the designated apparatus, higher than the priority (S46) of the external program 66, which cannot instruct the image processing operation that can be executed by the designated apparatus.

Then, the terminal program 65 determines the setting value of the device change flag (S47). When it is determined that the first value "ON" is set for the device change flag (S47: ON), the terminal program 65 sets the second value "OFF" for the device change flag (S48), instead of the processing of S49 and S50, and ends the priority determination processing A. On the other hand, when it is determined that the second value "OFF" is set for the device change flag (S47: OFF), the terminal program 65 determines the setting value of the install information of each of the program records read in S42 (S49). Incidentally, for the label program for which the priority has been determined as "5", the processing of S49 and S50 is skipped.

Then, the terminal program 65 changes the priorities of the cooperation application, the mail print application, and the print dedicated application, for which "installed" or "uninstalled" has been set in the install information, to "4" (S49: No→S50). On the other hand, the terminal program 65 does not change the priority of the greeting card application for which "not installed" has been set in the install information (S49: Yes). In other words, in the processing of S49 and S50, the terminal program 65 sets the priority (S44, S45) of the external program 66, for which "not installed" has been set in the install information, higher than the priority (S50) of the external program 66 for which "installed" or "uninstalled" has been set in the install information.

Although the detailed description is thereafter omitted, when it is determined that the designated apparatus information has not been stored in the memory 62 (S41: No), the terminal program 65 determines an arrangement of the application icons, which are to be included in the application introduction screen, as a preset default arrangement, instead of the processing of S42 to S50. The default arrangement may be an order of the program records registered in the program list, for example.

Figure 12B:
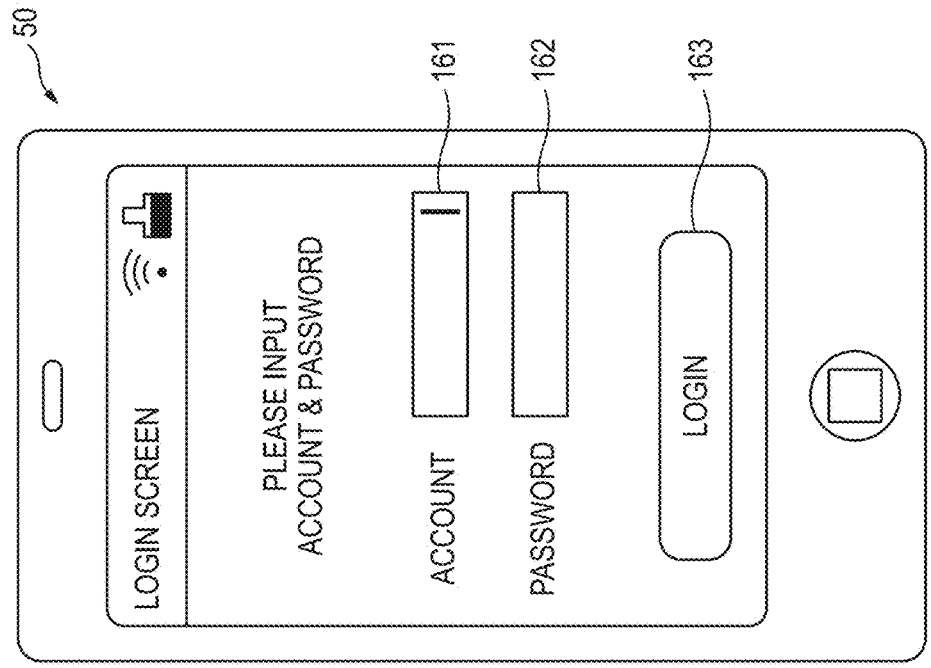

Then, in S19, the terminal program 65 displays an application introduction screen shown in FIG. 12B on the display 53, in accordance with the priorities determined in the priority determination processing A. That is, the terminal program 65 more preferentially displays the application icon corresponding to the external program 66 having the relatively high priority than the application icon corresponding to the external program 66 having the relatively low priority. The description "preferentially displays" may be a display in front of the arrangement order (for example, from top to bottom) on the application introduction screen, for example. Also, in the application introduction screen of FIG. 12B, the application icon corresponding to the label application having the priority "5" is not displayed.

In other words, the terminal program 65 extracts the application ID of the external program 66, for which the priority "1" has been determined, of the application IDs registered in the program list, and displays the application icon having the extracted application ID described thereon at the head of the arrangement order. Then, the terminal program 65 extracts the application ID of the external program 66, for which the priority "2" has been determined, and displays the application icon having the extracted application ID described thereon at the rear of the arrangement order, as compared to the application icon having the priority "1". Then, the same processing is executed for the application icons having the priorities "3" and "4". Incidentally, the terminal program 65 does not extract the application ID of the external program 66 for which the priority "5" has been determined.

In the above example, the terminal program 65 arranges the application icon 171 corresponding to the greeting card application for which the priority "1" has been determined, the application icon 172 corresponding to the PDF conversion application for which the priority "2" has been determined, and the application icons 173, 174, 175 corresponding to the cooperation application, the mail print application, and the print dedicated application for which the priority "2" has been determined, in corresponding order. Incidentally, the arrangement order of the plurality of application icons having the same priority may be the default arrangement, for example.

(Priority Determination Processing B)

Figures 7, 7A, 7B:
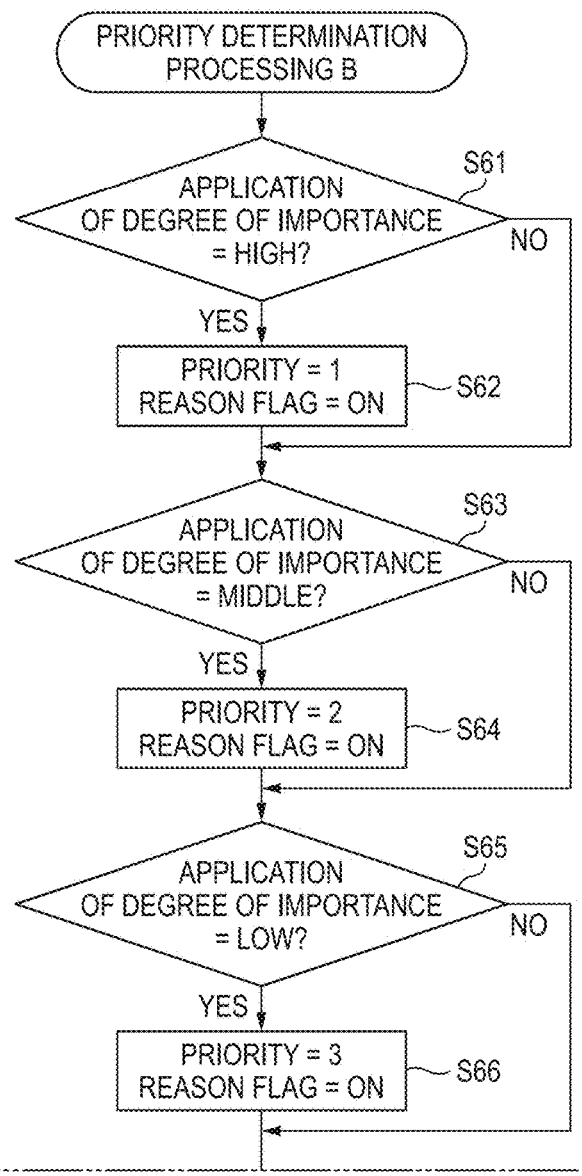
FIGS. 7A and 7B are flowcharts of priority determination processing B.
Figure 7B:
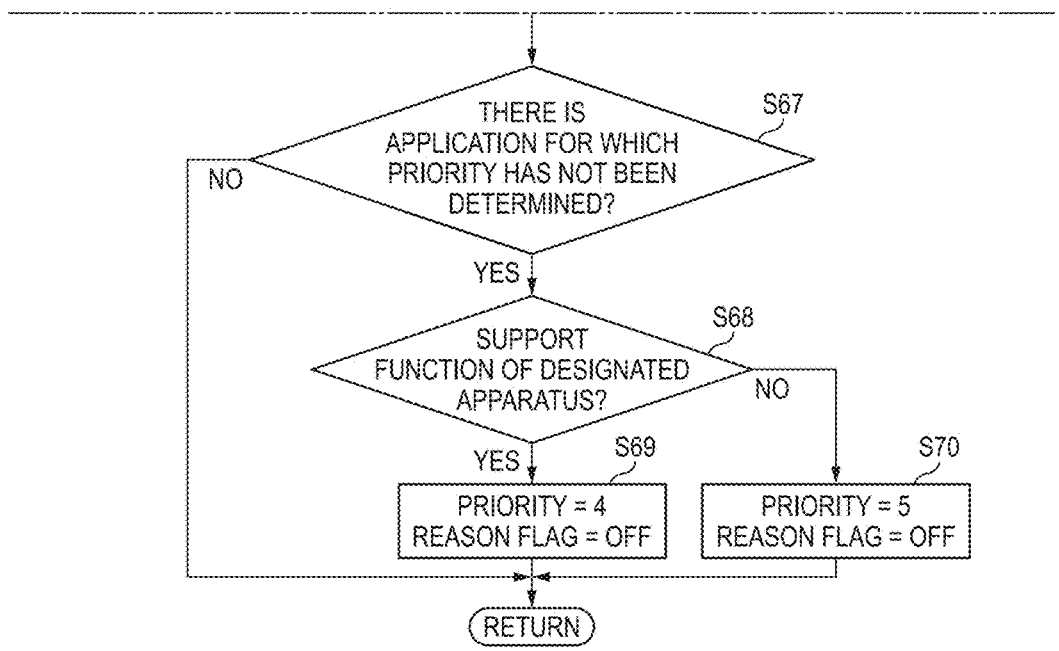
Figure 8B:
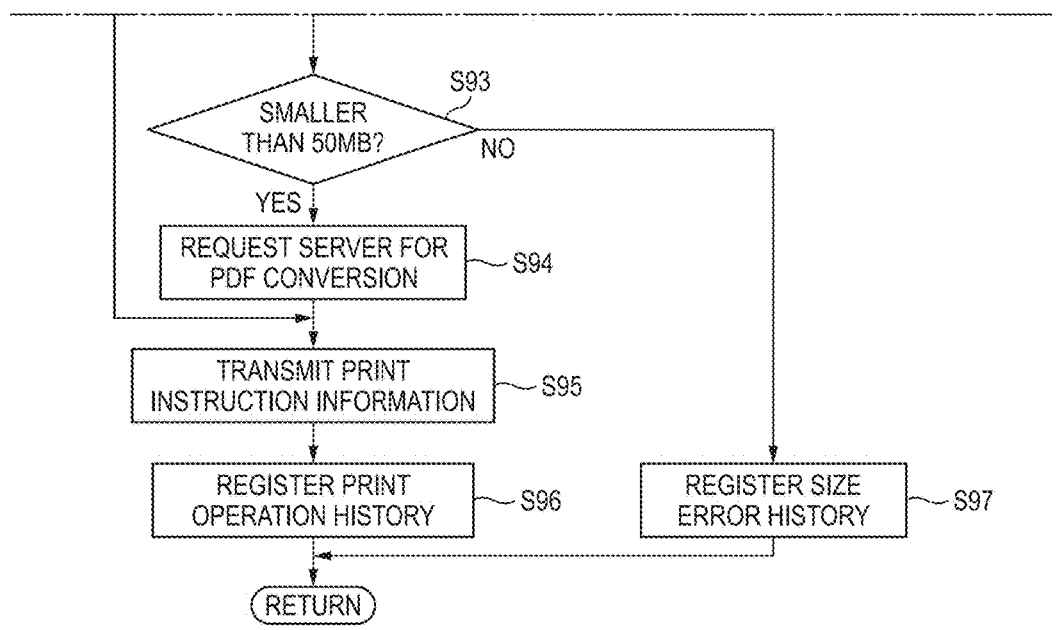
FIGS. 8A and 9B are flowcharts of print processing.

The priority determination processing B shown in FIGS. 7A and 7B is processing of determining a priority of each of the plurality of external programs 66 when the history information includes the specific history. In the priority determination processing B, the priority is a parameter for determining whether the application icon corresponding to the external program 66 is to be made designable through the input I/F 54 and determining the display order of the application icons. Incidentally, it is assumed that the priority "1" is highest and the priority "5" is lowest. In the below, the priority determination processing B is described in detail while assuming that the apparatus information of the MFP 10A is stored in the memory 62, as the designated apparatus information.

First, the terminal program 65 reads out the extraction conditions corresponding to the degree of importance "high" from the program list. Then, the terminal program 65 compares each of the read extraction conditions and the history information stored in the memory 62 (S61). In the example of FIG. 3, the extraction conditions "login error" and "size error" are read out.

As an example, when it is determined that the history information includes the size error history (S61: Yes), the terminal program 65 determines the priority of the PDF conversion application corresponding to the extraction condition "size error", as "1", and sets the third value "ON" for the reason flag of the PDF conversion application (S62). As another example, when it is determined that the history information includes the login error history (S61: No), the terminal program 65 skips over the processing of S62 for the mail print application corresponding to the extraction condition "login error".

Likewise, the terminal program 65 reads out the extraction conditions corresponding to the degree of importance "middle", and the extraction conditions corresponding to the degree of importance "low" from the program list. Then, the terminal program 65 compares each of the read extraction conditions and the history information stored in the memory 62 (S63, S65). In the example of FIG. 3, the extraction conditions "label corresponding device", "sheet size=postcard", "print and scan are executed with separate devices", and "number of print times=5 times" are read out. Incidentally, since the priority of the PDF conversion application has been already determined as "1", the extraction condition "server conversion=5 times" of the degree of importance "low" is not read out.

As an example, when it is determined that the history information does not include the designated apparatus history including the operation ID "label print" or "label scan" (S63: No), the terminal program 65 skips over processing of S64 for the label application corresponding to the extraction condition "label corresponding device" of the degree of importance "middle". Although the detailed description is thereafter omitted, when it is determined that the history information includes the designated apparatus history including the operation ID "label print" or "label scan" (S63: Yes), the terminal program 65 determines the priority of the label application corresponding to the extraction condition "label corresponding device" of the degree of importance "middle", as "2", and sets the third value "ON" for the reason flag of the label application (S64).

As another example, when it is determined that the history information includes the operation history including the parameter "postcard" of the item "size" (S65: Yes), the terminal program 65 determines the priority of the greeting card application corresponding to the extraction condition "sheet size=postcard" of the degree of importance "low", as "3", and sets the third value "ON" for the reason flag of the greeting card application (S66). As another example, when it is determined that the history information includes the five operation history including the operation ID "sheet print" (S65: Yes), the terminal program 65 determines the priority of the print dedicated application corresponding to the extraction condition "number of print times=5 times" of the degree of importance "low", as "3", and sets the third value "ON" for the reason flag of the print dedicated application (S66).

As another example, when it is determined that the history information does not include the operation history including the operation ID "sheet print" and a first designated apparatus ID and the operation history including the operation ID "sheet scan" and a second designated apparatus ID (S65: No), the terminal program 65 skips over the processing of S66 for the cooperation application corresponding to the extraction condition "print and scan are executed with separate devices" of the degree of importance "low". Incidentally, the first designated apparatus ID and the second designated apparatus ID indicate the apparatus IDs different from each other.

Then, the terminal program 65 determines whether there is the external program 66 of which the priority has not been determined in S61 to S66 (S67). When it is determined that the priorities of all the external programs 66 have been determined in S61 to S66 (S67: No), the terminal program 65 skips over processing of S68 to S70, which will be described later, and ends the priority determination processing B. On the other hand, when it is determined that there is the external program 66 of which the priority has not been determined in S61 to S66 (S67: Yes), the terminal program 65 compares the operation ID included in the function information of the external program 66 of which the priority has not been determined and the operation ID included in the designated apparatus information (S68).

As an example, since the function information of the cooperation application and the mail print application includes at least some of the operation IDs included in the designated apparatus information (S68: Yes), the terminal program 65 determines the priorities of the cooperation application and the mail print application, as "4", and sets the fourth value "OFF" for the reason flags of the cooperation application and the mail print application (S69). As another example, since the function information of the label application does not include any of the operation IDs included in the designated apparatus information (S68: No), the terminal program 65 determines the priority of the label application, as "5", and sets the fourth value "OFF" for the reason flag of the label application (S70).

That is, the terminal program 65 sets the priority of the external program 66, which corresponds to the extraction condition coinciding with the history information, higher when the corresponding degree of importance is higher (S62, S64, S66). Also, the terminal program 65 sets the priority (S62, S64, S66) of the external program 66, which corresponds to the extraction condition coinciding with the history information, higher than the priority (S69, S70) of the external program 66, which corresponds to the extraction condition not coinciding with the history information. Also, the terminal program 65 sets the priority (S69) of the external program 66, which can instruct at least some of the image processing operations that can be executed by the designated apparatus, of the external programs 66 of which the history information does not satisfy the extraction condition higher than the priority (S70) of the external program 66, which cannot instruct any of the image processing operations that can be executed by the designated apparatus.

Figure 13A:
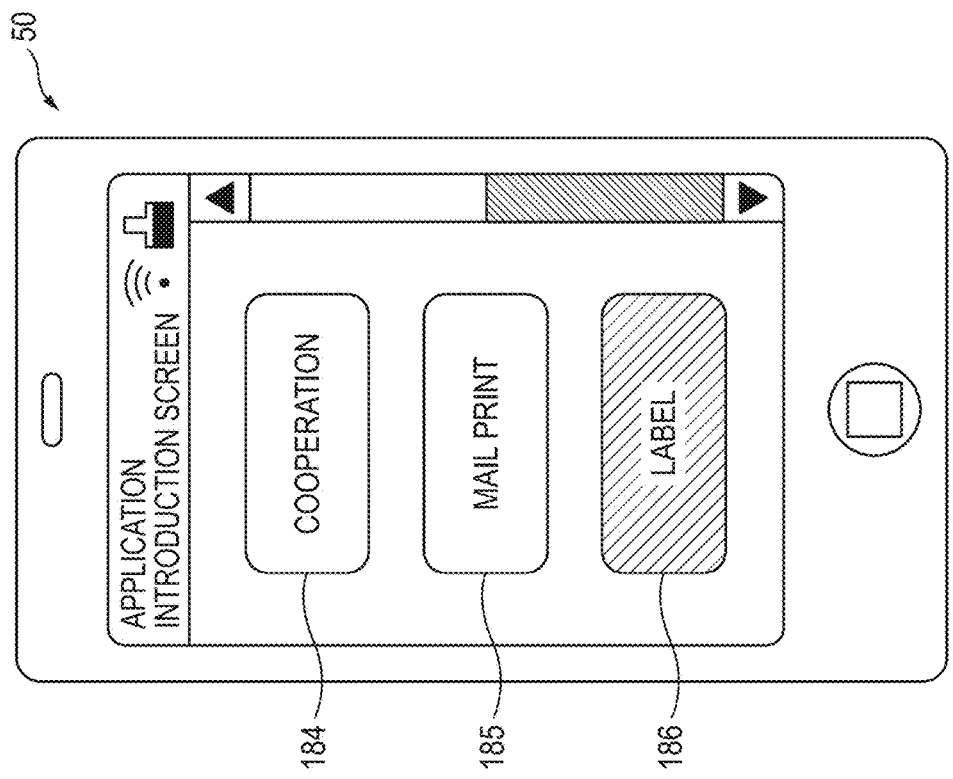
Figure 13B:
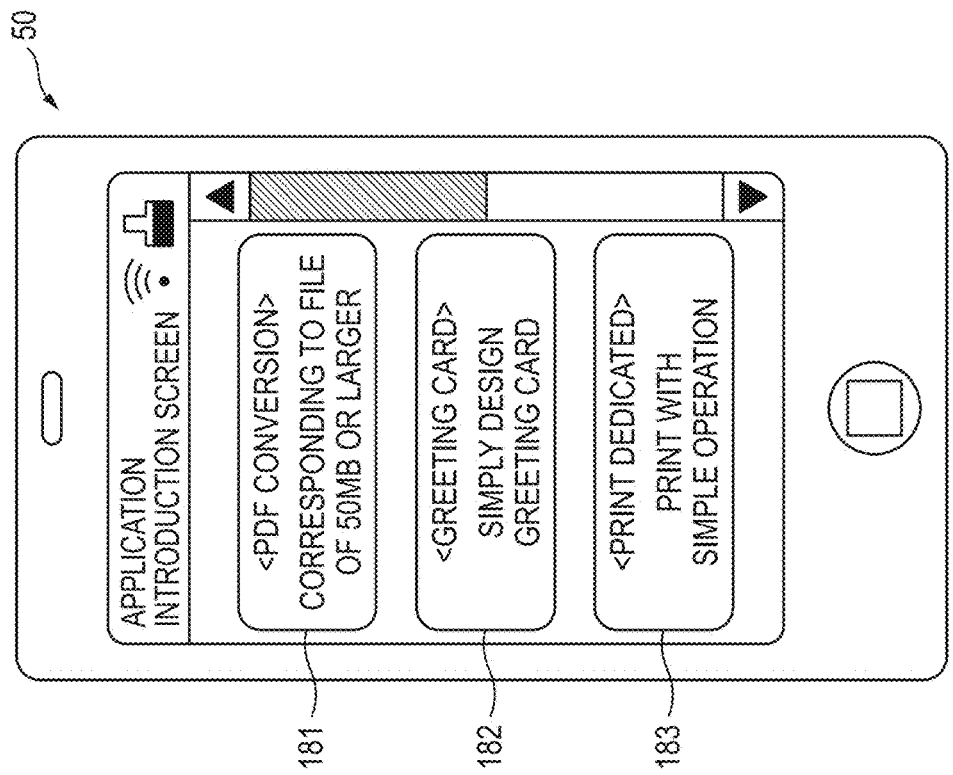

Then, in S19, the terminal program 65 displays an application introduction screen shown in FIG. 13 on the display 53 in accordance with the priorities determined in the priority determination processing B. Incidentally, the configuration "application icons 181 to 186 are displayed on the application introduction screen" is not limited to a configuration where all the application icons 181 to 186 are displayed at the same time, and may be a configuration where a part of the application introduction screen having a size larger than a display area of the display 53 is selectively displayed by an operation on a scroll bar, as shown in FIGS. 13A and 13B.

In the example of FIG. 13, the terminal program 65 more preferentially displays the application icon corresponding to the external program 66 having the relatively high priority than the application icon corresponding to the external program 66 having the relatively low priority. Also, the terminal program 65 describes the recommendation reasons on the application icons 181, 182, 183 corresponding to the external programs 66 in which the third value "ON" is set for the reason flag. Incidentally, the terminal program 65 does not describe the recommendation reasons on the application icons 184, 185, 186 corresponding to the external programs 66 in which the third value "OFF" is set for the reason flag.

Also, the terminal program 65 includes the application icons 181 to 185, which correspond to the external programs 66 having the determined priorities "1" to "4", in the application introduction screen so that the icons can be designated through the input I/F 54. On the other hand, the terminal program 65 includes the application icon 186, which corresponds to the label application having the determined priority "5", in the application introduction screen so that the icon cannot be designated (for example, grayout) through the input I/F 54. This is an example of the configuration of extracting the application IDs of the external programs 66 having the determined priorities "1" to "4" and not extracting the application ID of the external program 66 having the determined priority "5".

Advantages of Illustrative Embodiment

According to the illustrative embodiment, the external program 66, which coincides with the history information accumulated in the past, of the plurality of external programs 66 that can be activated by the terminal program 65 is notified to the user through the application introduction screen. That is, it is possible to enable the user to recognize the external program 66, which coincides with the user's implementation intention through the terminal program 65, of the plurality of external programs 66 published on the Internet.

More specifically, the external programs 66, which can instruct at least some of the image processing operations that can be executed by the designated apparatus, is notified through the application introduction screen (S44, S45). Thereby, it is possible to enable the user to recognize the external program 66, which is suitable for instructing the designated apparatus designated by the user to execute the image processing operation, of the plurality of external programs 66 published on the Internet. That is, it is possible to suggest a new using method of the designated apparatus to the user. Also, the external program 66 having more image processing operations, which can be instructed to the designated apparatus, is set to have the higher priority of the notification. Therefore, it is possible to suggest the efficient using method of the designated apparatus to the user.

Also, the external program 66 (S49: Yes) that has not been installed in the portable device 50 is more preferentially notified than the external program 66 (S49: No) that has been installed in the portable device 50. It is thought that the user perceives the function of the external program 66 installed in the portable device 50 and the function of the external program 66 uninstalled from the portable device 50.

Therefore, when the external program 66 that has not been installed is preferentially notified, it is possible to provide the user with the useful information.

Meanwhile, in the priority determination processing A, the terminal program 65 may be configured to set the priority of the external program 66 installed in the portable device 50 (i.e., "installed" is set in the install information) higher than the priority of the external program 66 uninstalled from the portable device 50 (i.e., "uninstalled" is set in the install information). Since there is a high possibility that the user of the portable device 50 has determined the external program 66 uninstalled from the portable device 50 as unnecessary, it is preferably to set the priority of notification lower, as described above.

Also, the portable device 50 may be configured to receive an update module of the external program 66 from a server (not shown) on the Internet through the communication I/F 55 and to update the external program 66 with the received update module. In the priority determination processing A, the terminal program 65 may be configured to set the priority of the external program 66 updated within a threshold time period higher than the priority of the external program 66 not updated within a threshold time period. Since there is a possibility that a new function is added to the updated external program 66, it is preferable to preferentially notify the updated external program.

Also, the external program 66 corresponding to the extraction condition, which coincides with the history information, is notified through the application introduction screen. In this case, the external program 66 having a preset high degree of importance is more preferentially notified than the external program 66 having a low degree of importance. According to the illustrative embodiment, it is easy to enable the user to recognize the external program 66, which is thought to be more necessary to the user. Also, by describing the recommendation reason on the application icon, it is possible to enable the user to recognize what using aspect the notified external program 66 coincides with.

Also, it may be necessary to perform communication with the server on the Internet before enabling the designated apparatus to execute the image processing operation. Also, the communication with the server on the Internet has diverse errors and limits. Therefore, when the mail print application specialized to the communication with the mail server or the PDF conversion application for replacing the function of the server on the Internet is notified through the application introduction screen, like the illustrative embodiment, it is possible to suggest a method, which is suitable for enabling the designated apparatus to execute the image processing operation, to the user.

Also, when the MFP 10B capable of executing the non-correspondence operation (for example, the label print operation and the label scan operation) of the terminal program 65 is designated as the designated apparatus, the external program 66 that can instruct the MFP 10B to execute the image processing operation is notified through the application introduction screen. Thereby, it is possible to suggest a method for enabling the designated apparatus to execute the non-correspondence operation of the terminal program 65 to the user.

Also, it is necessary for the user of the terminal program 65 to select the designated operation, which is to be executed by the designated apparatus, through the operation icons 111, 112 displayed on the main screen. Incidentally, this step is omitted for the print dedicated application. As the print dedicated application is dedicated to instruct the sheet print operation, the print dedicated application can designate the print operation as the designated operation without receiving selection of the designated operation through the operation icons 111, 112. For example, the operation icon 112, which corresponds to the execution instruction of the sheet scan operation, may not be displayed on the main screen. Also, the print dedicated application may receive a more specific setting, as compared to the terminal program 65 configured to support a plurality of image processing operations. Therefore, when the print dedicated application specialized to the sheet print operation is notified to the user who instructs the designated apparatus to execute the sheet print operation through the terminal program 65, it is possible to suggest a method, which is suitable for enabling the designated apparatus to execute the sheet print operation through the portable device 50, to the user.

Also, it is necessary for the user of the terminal program 65 to designate the parameter of each of the plurality of items configuring the execution condition. Incidentally, the step of designating the parameter of the specific item "size" is omitted for the greeting card application specialized to the sheet print operation (in the below, referred to as "specific operation") in accordance with the execution condition including the specific parameter "postcard". Also, the greeting card application may receive a more specific setting, as compared to the terminal program 65 configured to support an operation other than the specific operation. Therefore, when the greeting card application specialized to the specific operation is notified to the user who intends to cause the designated apparatus to execute the specific operation through the terminal program 65, it is possible to suggest a method, which is suitable for enabling the designated apparatus to execute the specific operation through the portable device 50, to the user.

Also, according to the illustrative embodiment, when the user who has recognized the external program 66 coinciding with the using aspect of the terminal program 65 designates the corresponding application icon, it is possible to activate or install the external program 66 corresponding to the application icon. Thereby, the operation of the user who intends to use the external program 66 coinciding with the using aspect is simplified. Incidentally, the display aspect of the application introduction screen is not limited to the above examples, and may be such an aspect that the application IDs, the application names, the recommendation reasons and the like of the external programs 66 of which priorities have been determined as "1" to "4" in the priority determination processing A, B are notified through the application screen.

In the illustrative embodiment, the priority determination processing A of determining the priority of the external program 66 by using the designated apparatus information, the function information, and the install information, and the priority determination processing B of determining the priority of the external program 66 by using the history information and the extraction condition information have been described. However, the combination of the information for determining the priority of the external program 66 is not limited to the above example. Also, the relation between the priority determination processing A, B and the layout of the application introduction screen is not limited to the above example.

Also, in the illustrative embodiment, the priority determination processing A, B is executed before displaying the main screen. However, the execution timing of the priority determination processing A, B is not limited to the above example, and may be after the <application> icon 114 is designated until the application introduction screen is displayed. Also, in the illustrative embodiment, only when there is the external program 66 of which the priority is determined as "1" in the priority determination processing A, B, the recommendation image 115 is displayed with being associated with the <application> icon 114. However, the display condition of the recommendation image 115 is not limited to the above example.

Also, in the MFP 10 and the portable device 50 of the illustrative embodiment, the various programs stored in the memories 32, 62 are executed by the CPUs 31, 61, so that the respective processing to be executed by the controller of the disclosure is implemented. However, the configuration of the controller is not limited thereto and some or all of the controller may be implemented by the hardware such as an integrated circuit and the like.

Also, the disclosure can be implemented as not only the MFP 10 and the portable device 50 but also a program configured to enable the MFP 10 and the portable device 50 to execute the processing. The program may be provided with being recorded in a non-transitory recording medium. The non-transitory recording medium may include a memory mounted on a server that can be connected to the MFP 10 and the portable device 50 through the communication network 101, in addition to a CD-ROM, a DVD-ROM and the like. The program stored in the memory of the server may be transmitted through the communication network 101 such as the Internet, as information or signal indicative of the program.

What is claimed is:

1. A non-transitory computer-readable medium having a computer program stored thereon and readable by a computer of a portable device, the portable device comprising a memory, an input interface, a communication interface, and a display, the computer program, when executed by the computer, causes the portable device to perform:
   receiving, through the input interface, a user operation of designating operation specifying information, the operation specifying information specifying a content of an image processing operation to be executed by an image processing apparatus, wherein the receiving is performed by receiving a user operation of designating a plurality of parameters corresponding to each of a plurality of items;
   instructing the image processing apparatus, which is able to perform communication with the portable device through the communication interface, to execute the image processing operation of the content specified by the operation specifying information, wherein the instructing is performed by instructing the image processing apparatus to execute the image processing operation in accordance with an execution condition indicated by the plurality of designated parameters; and
   storing, in the memory, history information indicative of an execution history of the receiving and the instructing, wherein the storing is performed by storing, in the memory, the history information indicative of the plurality of designated parameters,
   wherein the memory stores therein a plurality of sets of program identification information and extraction condition information, the program identification information being for identifying an external program, the external program being installable in the portable device and being able to instruct the image processing apparatus to execute the image processing operation, the extraction condition information corresponding to the history information that is storable in the memory, and
   wherein the computer program, when executed by the computer, further causes the portable device to perform:
      extracting, from among the plurality of program identification information, program identification information that is associated with the extraction condition information coinciding with the history information stored in the memory, wherein the extracting, in a case where the history information indicates the specific parameter, is performed by extracting program identification information of the external program specialized to the image processing operation in accordance with an execution condition including a specific parameter of a specific item; and
      displaying, on the display, the extracted program identification information.

2. The non-transitory computer-readable medium according to claim 1,
   wherein the program is able to instruct a first operation and a second operation,
   wherein the receiving is performed by receiving a user operation of designating one of the first operation and the second operation as a designated operation,
   wherein the instructing is performed by instructing the image processing apparatus to execute the designated operation,
   wherein the storing is performed by storing, in the memory, the history information indicative of the designated operation, and
   wherein the extracting, in a case where the history information indicates the first operation, is performed by extracting program identification information of the external program that is able to instruct only the first operation.

3. A non-transitory computer-readable medium having a computer program stored thereon and readable by a computer of a portable device, the portable device comprising a memory, an input interface, a communication interface, and a display, the computer program, when executed by the computer, causes the portable device to perform:
   receiving, through the input interface, a user operation of designating operation specifying information, the operation specifying information specifying a content of an image processing operation to be executed by an image processing apparatus;
   instructing the image processing apparatus, which is able to perform communication with the portable device through the communication interface, to execute the image processing operation of the content specified by the operation specifying information; and
   storing, in the memory, history information indicative of an execution history of the receiving and the instructing,
   wherein the memory stores therein a plurality of sets of program identification information and extraction condition information, the program identification information being for identifying an external program, the external program being installable in the portable device and being able to instruct the image processing apparatus to execute the image processing operation, the extraction condition information corresponding to the history information that is storable in the memory, and
   wherein the computer program, when executed by the computer, further causes the portable device to perform:

extracting, from among the plurality of program identification information, program identification information that is associated with the extraction condition information coinciding with the history information stored in the memory; and displaying, on the display, the extracted program identification information, wherein the receiving is performed by receiving a user operation of designating an obtaining source of designated data, which is a target of the image processing operation, wherein the instructing is performed by instructing the image processing apparatus to execute the image processing operation for the designated data obtained from the designated obtaining source, wherein the storing is performed by storing, in the memory, the history information indicating whether the designated data was able to be obtained from the designated obtaining source, and wherein the extracting, in a case where the history information indicates that the designated data was unable to be obtained from the obtaining source on the Internet, is performed by extracting program identification information of the external program specialized to obtaining of the designated data from the obtaining source.

4. A non-transitory computer-readable medium having a computer program stored thereon and readable by a computer of a portable device, the portable device comprising a memory, an input interface, a communication interface, and a display, the computer program, when executed by the computer, causes the portable device to perform:

receiving, through the input interface, a user operation of designating operation specifying information, the operation specifying information specifying a content of an image processing operation to be executed by an image processing apparatus;

instructing the image processing apparatus, which is able to perform communication with the portable device through the communication interface, to execute the image processing operation of the content specified by the operation specifying information; and storing, in the memory, history information indicative of an execution history of the receiving and the instructing, wherein the memory stores therein a plurality of sets of program identification information and extraction condition information, the program identification information being for identifying an external program, the external program being installable in the portable device and being able to instruct the image processing apparatus to execute the image processing operation, the extraction condition information corresponding to the history information that is storable in the memory, and wherein the computer program, when executed by the computer, further causes the portable device to perform:

extracting, from among the plurality of program identification information, program identification information that is associated with the extraction condition information coinciding with the history information stored in the memory; and displaying, on the display, the extracted program identification information, wherein the receiving is performed by receiving a user operation of designating designated data, which is a target of the image processing operation, wherein the computer program, when executed by the computer, further causes the portable device to perform:

in response to the designated data of a first format being designated, requesting a server on the Internet to convert the designated data from the first format to a second format, wherein the instructing is performed by instructing the image processing apparatus to execute the image processing operation for the converted designated data that has been converted into the second format by the server, wherein the storing is performed by storing, in the memory, the history information indicating whether a format of the designated data was able to be converted by the server, and wherein the extracting, in a case where the history information indicates that the format of the designated data was unable to be converted by the server, is performed by extracting program identification information of the external program that is able to convert the designated data from the first format to the second format.

5. The non-transitory computer-readable medium according to claim 3, wherein the displaying is performed by displaying the plurality of extracted program identification information in order of:

a first external program that is able to solve an error having occurred during performing the receiving and the instructing;

a second external program for instructing a non-correspondence operation that the computer program is unable to instruct; and a third external program specialized to a correspondence operation that the computer program is able to instruct.

6. The non-transitory computer-readable medium according to claim 4, wherein the displaying is performed by displaying the plurality of extracted program identification information in order of:

a first external program that is able to solve an error having occurred during performing the receiving and the instructing;

a second external program for instructing a non-correspondence operation that the computer program is unable to instruct; and a third external program specialized to a correspondence operation that the computer program is able to instruct.

7. The non-transitory computer-readable medium according to claim 1, wherein the displaying is performed by displaying a first program identification information of the external program more preferentially than a second program identification information of the external program, the first program identification information having not been installed in the portable device, the second program identification information of the external program having been installed in the portable device.

8. The non-transitory computer-readable medium according to claim 1, wherein the external program installed in the portable device is updatable by using an update module published at a server on the Internet, and wherein the displaying is performed by displaying a first program identification information of the external program more preferentially than a second program identification information of the external program, the first program identification information having been updated within a threshold time period, the second program identification information having not been updated within the threshold time period.

9. The non-transitory computer-readable medium according to claim 1, wherein the displaying is performed by displaying a first program identification information of the external program more preferentially than a second program identification information of the external program, the first program identification information being installed in the portable device, the second program identification information of the external program having been uninstalled from the portable device.

10. The non-transitory computer-readable medium according to claim 1,
wherein the displaying is performed by displaying an object in which the extracted program identification information is described, the object being associated with the external program identified with the described program identification information, and
wherein the computer program, when executed by the computer, further causes the portable device to perform:
receiving, through the input interface, a user operation of designating the displayed object;
determining whether the external program associated with the designated object is installed in the portable device;
in a case where it is determined that the external program is installed, activating the external program; and
in a case where it is determined that the external program is not installed, installing the external program in the portable device.

11. The non-transitory computer-readable medium according to claim 1, wherein the displaying is performed by displaying a text indicative of a reason to extract the program identification information in the extracting in association with the program identification information.

12. A portable device comprising:
a memory;
an input interface;
a communication interface;
a display; and
a controller configured to:
receive, through the input interface, a user operation of designating operation specifying information, the operation specifying information specifying a content of an image processing operation to be executed by an image processing apparatus;
instruct the image processing apparatus, which is able to perform communication with the portable device through the communication interface, to execute the image processing operation of the content specified by the operation specifying information; and
store, in the memory, history information indicative of an execution history of the receiving and the instructing,
wherein the memory stores therein a plurality of sets of program identification information and extraction condition information, the program identification information being for identifying an external program, the external program being installable in the portable device and being able to instruct the image processing apparatus to execute the image processing operation, the extraction condition information corresponding to the history information that is storable in the memory, and wherein the controller is further configured to:
extract, from among the plurality of program identification information, program identification information that is associated with the extraction condition information coinciding with the history information stored in the memory, of the plurality of program identification information stored in the memory; and
display, on the display, the extracted program identification information,
wherein the displaying is performed by displaying an object in which the extracted program identification information is described, the object being associated with the external program identified with the described program identification information, and
wherein the controller is further configured to:
receive, through the input interface, a user operation of designating the displayed object;
determine whether the external program associated with the designated object is installed in the portable device;
in a case where it is determined that the external program is installed, activate the external program; and
in a case where it is determined that the external program is not installed, install the external program in the portable device.

13. The portable device according to claim 12,
wherein the receiving is performed by receiving a user operation of designating one of a plurality of the image processing apparatuses, which are able to perform communication through the communication interface, as a designated apparatus,
wherein the instructing is performed by instructing the designated apparatus to execute the image processing operation,
wherein the storing is performed by storing, in the memory, the history information indicating the image processing operation that is executable by the designated apparatus, and
wherein the extracting is performed by extracting program identification information of the external program that is able to instruct the image processing apparatus to execute the image processing operation indicated by the history information.

14. The portable device according to claim 13,
wherein the history information indicates that the designated apparatus is able to execute a first operation and a second operation,
wherein the extracting is performed by extracting program identification information of the external program that is able to instruct at least one of the first operation and the second operation, and
wherein the displaying is performed by displaying, on the display, a first program identification information of the external program more preferentially than a second program identification information of the external program, the first program identification information being able to instruct both the first operation and the second operation, the second program identification information being able to instruct one of the first operation and the second operation.

15. The portable device according to claim 13, wherein the displaying is performed by displaying a text indicative of a reason to extract the program identification information in the extracting in association with the program identification information.

* * * * *